United States Patent
Muraki

(10) Patent No.: US 9,618,371 B2
(45) Date of Patent: Apr. 11, 2017

(54) ULTRASONIC FLOWMETER, FLOW VELOCITY MEASUREMENT METHOD, AND FLOW VELOCITY MEASUREMENT PROGRAM

(71) Applicant: Azbil Corporation, Tokyo (JP)

(72) Inventor: Koji Muraki, Tokyo (JP)

(73) Assignee: Azbil Corporation, Tokyo (JP)

( * ) Notice: Subject to any disclaimer, the term of this patent is extended or adjusted under 35 U.S.C. 154(b) by 44 days.

(21) Appl. No.: 14/778,540

(22) PCT Filed: Jan. 20, 2014

(86) PCT No.: PCT/JP2014/050933
§ 371 (c)(1),
(2) Date: Sep. 18, 2015

(87) PCT Pub. No.: WO2014/148081
PCT Pub. Date: Sep. 25, 2014

(65) Prior Publication Data
US 2016/0290845 A1    Oct. 6, 2016

(30) Foreign Application Priority Data
Mar. 21, 2013  (JP) ................................ 2013-058268

(51) Int. Cl.
*G01F 1/66* (2006.01)

(52) U.S. Cl.
CPC ................ *G01F 1/66* (2013.01); *G01F 1/667* (2013.01); *G01F 1/668* (2013.01)

(58) Field of Classification Search
CPC ...................................................... G01F 1/66
(Continued)

(56) References Cited

U.S. PATENT DOCUMENTS

| 6,625,549 B1* | 9/2003 | Nawa ........................ G01F 1/66 |
| | | 702/50 |
| 2012/0285260 A1 | 11/2012 | Muller et al. |
| 2015/0355002 A1* | 12/2015 | Sasaki ..................... G01F 1/667 |
| | | 73/861.28 |

FOREIGN PATENT DOCUMENTS

| DE | 102009045620 A | 5/2011 |
| EP | 2488835 A | 8/2012 |

(Continued)

OTHER PUBLICATIONS

International Search Report for PCT Patent Application No. PCT/JP2014/050933 mailed on Mar. 11, 2014, 3 pages (1 page of English Translation of International Search Report and 2 pages of International Search Report).

*Primary Examiner* — Jewel V Thompson
(74) *Attorney, Agent, or Firm* — Amster, Rothstein & Ebenstein, LLP

(57) ABSTRACT

An ultrasonic flowmeter includes
a main body that calculates components parallel to a pipe axis regarding the velocity of fluid on the basis of a first propagation time difference, which is the difference in time between the time that ultrasonic waves transmitted from a second ultrasonic transceiver and the time that ultrasonic waves transmitted from a first ultrasonic transceiver propagate through a first flow propagation path traversing inside the pipe in the radial direction for 2n−1 times (n is a positive integer), and a second propagation time difference, which is the difference in time between the time that ultrasonic waves transmitted from the second ultrasonic transceiver and the time that ultrasonic waves transmitted from the first ultrasonic transceiver propagate through the second flow propa- (Continued)

gation path traversing inside the pipe in the radial direction for 2m−1 times (m is a positive integer other than n).

8 Claims, 17 Drawing Sheets

(58) Field of Classification Search
USPC .......................... 73/861.26, 861.27, 861.28
See application file for complete search history.

(56) References Cited

FOREIGN PATENT DOCUMENTS

| | | |
|---|---|---|
| JP | S62-009224 A | 1/1987 |
| JP | 2009-014611 A | 1/2009 |
| JP | 4939907 B2 | 3/2012 |
| JP | 2013-507623 A | 3/2013 |
| WO | 2011/045107 A1 | 4/2011 |

* cited by examiner

ULTRASONIC FLOWMETER, FLOW VELOCITY MEASUREMENT METHOD, AND FLOW VELOCITY MEASUREMENT PROGRAM

CROSS-REFERENCE TO RELATED APPLICATIONS

This application is a National Stage Entry under 35 U.S.C. 371 of International Patent Application No. PCT/JP2014/050933, filed on Jan. 20, 2014, which claims the benefit of and priority to Japanese Patent Application No. 2013-058268, filed on Mar. 21, 2013, the entire contents of which are incorporated by reference herein.

FIELD OF INDUSTRIAL USE

Some embodiments according to the present invention are related to an ultrasonic flowmeter to measure the velocity of fluid flowing in a pipe by using ultrasonic wares, a flow velocity measurement method, and flow velocity measurement program.

PRIOR ART

Conventionally, this type of ultrasonic flowmeter typically includes a pair of ultrasonic transceivers arranged on the upstream and downstream sides regarding the direction of flow in a pipe while an ultrasonic reflector is fitted into the pipe in between these ultrasonic transceivers (for example, refer to PTR 1).

CITATION LIST

Patent Literature

[PTR 1] Japanese Patent No. 4939907

SUMMARY OF THE INVENTION

Problem to be Solved by the Invention

With conventional ultrasonic flowmeters in which the pair of ultrasonic transceivers are arranged on the same straight line, the dimensions, particularly the length in the axial direction of the pipe, of the ultrasonic transceivers are increased to increase the velocity of the measurable fluid, which may cause the ultrasonic transceivers to interfere with each other.

The pair of ultrasonic transceivers in other types of ultrasonic flowmeters, however, is arranged to sandwich the pipe.

With type of ultrasonic flowmeter, however, the velocity of fluid flowing in the pipe cannot be accurately measured if this fluid velocity contains components perpendicular to the axial direction of the pipe.

In view of the aforementioned problem, one aim of some aspects of the present embodiment is to provide an ultrasonic flowmeter that may accurately measure fluid velocity without causing interference between the ultrasonic transceivers, and a corresponding flow velocity measurement method and flow velocity measurement program.

Means for Solving the Problem

An ultrasonic flowmeter is equipped with a first ultrasonic transceiver that transmits and receives ultrasonic waves and is fitted to a pipe through which a fluid flows inside, a second ultrasonic transceiver that transmits and receives ultrasonic waves and is fitted to the pipe downstream from the first ultrasonic transceiver, and a main unit that measures the velocity of the fluid, in which the first ultrasonic transceiver and the second ultrasonic transceiver are arranged to sandwich the fluid, and the main unit calculates components parallel to the pipe regarding the velocity of the fluid on the basis of the a propagation time difference, which is the difference in time between the time that ultrasonic waves transmitted from the second ultrasonic transceiver and the time that ultrasonic waves transmitted from the first ultrasonic transceiver propagate through a first fluid propagation path traversing inside the pipe in the radial direction for a 2n−1 number of times (n is a positive integer), and a second propagation time difference, which is the difference in time between the time that ultrasonic waves transmitted from the second ultrasonic transceiver and the time that ultrasonic waves transmitted from the first ultrasonic transceiver propagate through a second fluid propagation path traversing inside the pipe in the radial direction for a 2m−1 number of times (m is a positive integer other than n).

According to this configuration, the first ultrasonic transceiver and the second ultrasonic transceiver are arranged to sandwich the fluid flowing in the pipe, and the main unit calculates the components parallel to the pipe axis regarding the velocity of the fluid on the basis of the first propagation time difference, which is the difference in time between the time that ultrasonic waves transmitted from the second ultrasonic transceiver and the time that ultrasonic waves transmitted from the first ultrasonic transceiver propagate through the first fluid propagation path traversing inside the pipe in the radial direction for a 2n−1 number of times (n is a positive integer), and the second propagation time difference, which is the difference in time between the time that ultrasonic waves transmitted from the second ultrasonic transceiver and the time that ultrasonic waves transmitted from the first ultrasonic transceiver propagate through the second fluid propagation path traversing inside the pipe in the radial direction for a 2m−1 number of times (m is a positive integer other than n). Here, using the difference between the first propagation time difference and the second propagation time difference, the propagation time difference may be obtained from the time for the ultrasonic waves to propagate from the downstream side to the upstream side and the time for the ultrasonic waves to propagate from the upstream side to the downstream side through the fluid propagation path traversing in the pipe in the radial direction for a 2(n−m) number of times, which is an even number of times. The components parallel to the pipe axis regarding the velocity of the fluid are represented using the known values of the fluid velocity before measurement and the propagation time difference when fluid traverses inside the pipe for an even number of times. Thus, the main unit may accurately calculate the components parallel to the pipe axis regarding the velocity of the fluid on the basis of the first propagation time difference and the second propagation time difference even when the fluid flows at an angle in relation to the pipe axis and contains components perpendicular to the pipe axis regarding the velocity of the fluid.

As the components parallel to the pipe axis regarding the velocity of the fluid are calculated on the basis of the first propagation time difference and the second propagation time difference, there is no need to arrange a long straight pipe in the upstream side to limit the effects of components perpendicular to the pipe axis regarding the velocity of the fluid.

The first ultrasonic transceiver and the second ultrasonic transceiver are arranged to sandwich the fluid flowing in the pipe. As a result, increases in the dimensions (length in the axial direction of the pipe) of the first ultrasonic transceiver and the second ultrasonic transceiver do not cause the two to interfere with each other preventing (blocking) fitment.

Due to the arrangement in which the first ultrasonic transceiver and the second ultrasonic transceiver sandwich the fluid flowing in the pipe, the first ultrasonic transceiver and the second ultrasonic transceiver are less likely to receive pipe propagation waves in comparison with a scenario in which the first ultrasonic transceiver and the second ultrasonic transceiver are arranged on the same straight line of the pipe.

Preferably, the first ultrasonic transceiver and the second ultrasonic transceiver are each equipped with an ultrasonic sensor fitted to the outer circumference of the pipe.

According to this configuration, the first ultrasonic transceiver is equipped with an ultrasonic sensor fitted to the outer circumference of the pipe, and the second ultrasonic transceiver is equipped with an ultrasonic sensor fitted to the outer circumference of the pipe. As a result, the first ultrasonic transceiver and the second ultrasonic transceiver that send and receive ultrasonic waves may be readily fitted to pipes without any piping construction or modification.

Preferably, the first ultrasonic transceiver and the second ultrasonic transceiver are each equipped with two ultrasonic sensors fitted to the outer circumference of the pipe.

According to this configuration, the first ultrasonic transceiver is equipped with two ultrasonic sensors fitted to the outer circumference of the pipe, and the second ultrasonic transceiver is equipped with two ultrasonic sensors fitted to the outer circumference of the pipe. As a result, the first ultrasonic transceiver and the second ultrasonic transceiver that send and receive ultrasonic waves may be readily fitted to pipes without any piping construction or modification.

As the first ultrasonic transceiver is equipped with two ultrasonic sensors and the second ultrasonic transceiver is equipped with two ultrasonic sensors, one of the ultrasonic sensors of the first ultrasonic transceiver and one of the ultrasonic sensors of the second ultrasonic transceiver may be used to measure the first propagation time difference, for example, and the other ultrasonic sensor of the first ultrasonic transceiver and the other ultrasonic sensor of the second ultrasonic transceiver may be used to measure the second propagation time difference.

The first fluid propagation path traverses inside the pipe in the radial direction three times, and the second fluid propagation path traverses inside the pipe in the radial direction one time.

According to this configuration, the first fluid propagation path traverses inside the pipe in the radial direction three times, and the second fluid propagation path traverses inside the pipe in the radial direction one time. As a result, the propagation time difference for the path traversing inside the pipe two times may be readily obtained on the basis of the first propagation time difference and the second propagation time difference, and the main unit that calculates the components of the fluid velocity that are parallel to the pipe axis may be readily achieved (configured).

The first fluid propagation path traverses inside the pipe in the radial direction five times, and the second fluid propagation path traverses inside the pipe in the radial direction three times.

According to this configuration, the first fluid propagation path traverses inside the pipe in the radial direction five times, and the second fluid propagation path traverses inside the pipe in the radial direction three times. As a result, the propagation time difference for the path traversing inside the pipe two times may be readily obtained on the basis of the first propagation time difference and the second propagation time difference, and the main unit that calculates the components of the fluid velocity that are parallel to the pipe axis may be readily achieved (configured).

The first fluid propagation path traverses inside the pipe in the radial direction seven times, and the second fluid propagation path traverses inside the pipe in the radial direction five times.

According to this configuration, the first fluid propagation path traverses inside the pipe in the radial direction seven times, and the second fluid propagation path traverses inside the pipe in the radial direction five times. As a result, the propagation time difference for the path traversing inside the pipe two times may be readily obtained on the basis of the first propagation time difference and the second propagation time difference, and the main unit that calculates the components of the fluid velocity that are parallel to the pipe axis may be readily achieved (configured).

Regarding a flow velocity measurement method according to the present invention, an ultrasonic flowmeter is equipped with a first ultrasonic transceiver that transmits and receives ultrasonic waves and is fitted to a pipe through which a fluid flows inside; a second ultrasonic transceiver that transmits and receives ultrasonic waves and is fitted to the pipe downstream from the first ultrasonic transceiver; a main unit that measures the velocity of the fluid, in which the first ultrasonic transceiver and the second ultrasonic transceiver are arranged to sandwich the fluid, and the method used by the ultrasonic flowmeter includes steps to calculate components parallel to the pipe regarding the velocity of the fluid on the basis of the a propagation time difference, which is the difference in time between the time that ultrasonic waves transmitted from the second ultrasonic transceiver and the time that ultrasonic waves transmitted from the first ultrasonic transceiver propagate through a first fluid propagation path traversing inside the pipe in the radial direction for a 2n−1 number of times (n is a positive integer), and a second propagation time difference, which is the difference in time between the time that ultrasonic waves transmitted from the second ultrasonic transceiver and the time that ultrasonic waves transmitted from the first ultrasonic transceiver propagate through a second fluid propagation path traversing inside the pipe in the radial direction for a 2m−1 number of times (m is a positive integer other than n).

According to this configuration, steps are included to calculate the components parallel to the pipe axis regarding the velocity of the fluid on the basis of the first propagation time difference, which is the difference in time between the time that ultrasonic waves transmitted from the second ultrasonic transceiver and the time that ultrasonic waves transmitted from the first ultrasonic transceiver propagate through the first flow propagation path traversing inside the pipe in the radial direction for 2n−1 times (n is a positive integer), and the second propagation time difference, which is the difference in time between the time that ultrasonic waves transmitted from the second ultrasonic transceiver and the time that ultrasonic waves transmitted from the first ultrasonic transceiver propagate through the second flow propagation path traversing inside the pipe in the radial direction for 2m−1 times (m is a positive integer other than n). Here, using the difference between the first propagation time difference and the second propagation time difference, the propagation time difference may be obtained from the time for the ultrasonic waves to propagate from the downstream side to the upstream side and the time for the ultrasonic waves to propagate from the upstream side to the downstream side through the fluid propagation path traversing in the pipe in the radial direction for a 2(n−m) number of times, which is an even number of times. The components parallel to the pipe axis regarding the velocity of the fluid are represented using the known values of the fluid velocity before measurement and the propagation time difference when fluid traverses inside the pipe for an even number of times. Thus, the main unit may accurately calculate the components parallel to the pipe axis regarding the velocity of the fluid on the basis of the first propagation time difference and the second propagation time difference even when the fluid flows at an angle in relation to the pipe axis and contains components perpendicular to the pipe axis regarding the velocity of the fluid.

As the components parallel to the pipe axis regarding the velocity of the fluid are calculated on the basis of the first propagation time difference and the second propagation time difference, there is no need to arrange a long straight pipe in the upstream side to limit the effects of components perpendicular to the pipe axis regarding the velocity of the fluid.

The first ultrasonic transceiver and the second ultrasonic transceiver are arranged to sandwich the fluid flowing in the pipe. As a result, increases in the dimensions (length in the axial direction of the pipe) of the first ultrasonic transceiver and the second ultrasonic transceiver do not cause the two to interfere with each other preventing (blocking) fitment.

Due to the arrangement in which the first ultrasonic transceiver and the second ultrasonic transceiver sandwich the fluid flowing in the pipe, the first ultrasonic transceiver and the second ultrasonic transceiver are less likely to receive pipe propagation waves in comparison with a scenario in which the first ultrasonic transceiver and the second ultrasonic transceiver are arranged on the same straight line of the pipe.

Regarding a flow velocity measurement program according to the present invention, an ultrasonic flowmeter is equipped with a first ultrasonic transceiver that transmits and receives ultrasonic waves and is fitted to a pipe through which a fluid flows inside; a second ultrasonic transceiver that transmits and receives ultrasonic waves and is fitted to the pipe downstream from the first ultrasonic transceiver; a main unit that measures the velocity of the fluid, in which the first ultrasonic transceiver and the second ultrasonic transceiver are arranged to sandwich the fluid, and the program executed by the ultrasonic flowmeter includes steps to calculate components parallel to the pipe regarding the velocity of the fluid on the basis of the propagation time difference, which is the difference in time between the time that ultrasonic waves transmitted from the second ultrasonic transceiver and the time that ultrasonic waves transmitted from the first ultrasonic transceiver propagate through a first fluid propagation path traversing inside the pipe in the radial direction for a 2n−1 number of times (n is a positive integer), and a second propagation time difference, which is the difference in time between the time that ultrasonic waves transmitted from the second ultrasonic transceiver and the time that ultrasonic waves transmitted from the first ultrasonic transceiver propagate through a second fluid propagation path traversing inside the pipe in the radial direction for a 2m−1 number of times (m is a positive integer other than n).

According to this configuration, steps are included to calculate the components parallel to the pipe axis regarding the velocity of the fluid on the basis of the first propagation time difference, which is the difference in time between the time that ultrasonic waves transmitted from the second ultrasonic transceiver and the time that ultrasonic waves transmitted from the first ultrasonic transceiver propagate through the first fluid propagation path traversing inside the pipe in the radial direction for 2n−1 times (n is a positive integer), and the second propagation time difference, which is the difference in time between the time that ultrasonic waves transmitted from the second ultrasonic transceiver and the time that ultrasonic waves transmitted from the first ultrasonic transceiver propagate through the second fluid propagation path traversing inside the pipe in the radial direction for 2m−1 times (m is a positive integer other than n), and the second propagation time difference. Here, using the difference between the first propagation time difference and the second propagation time difference, the propagation time difference may be obtained from the time for the ultrasonic waves to propagate from the downstream side to the upstream side and the time for the ultrasonic waves to propagate from the upstream side to the downstream side through the fluid propagation path traversing in the pipe in the radial direction for a 2(n−m) number of times, which is an even number of times. The components parallel to the pipe axis regarding the velocity of the fluid are represented using the known value of the fluid velocity before measurement and the propagation time difference when fluid traverses inside the pipe for an even number of times. Thus, the main unit may accurately calculate the components parallel to the pipe axis regarding the velocity of the fluid on the basis of the first propagation time difference and the second propagation time difference even when the fluid flows at an angle in relation to the pipe axis and contains components perpendicular to the pipe axis regarding the velocity of the fluid.

As the components parallel to the pipe axis regarding the velocity of the fluid are calculated on the basis of the first propagation time difference and the second propagation time difference, there is no need to arrange a long straight pipe in the upstream side to limit the effects of components perpendicular to the pipe axis regarding the velocity of the fluid.

The first ultrasonic transceiver and the second ultrasonic transceiver are arranged to sandwich the fluid flowing in the pipe. As a result, increases in the dimensions (length in the axial direction of the pipe) of the first ultrasonic transceiver and the second ultrasonic transceiver do not cause the two to interfere with each other preventing (blocking) fitment.

Due to the arrangement in which the first ultrasonic transceiver and the second ultrasonic transceiver sandwich the fluid flowing in the pipe, the first ultrasonic transceiver and the second ultrasonic transceiver are less likely to receive pipe propagation waves in comparison with a scenario in which the first ultrasonic transceiver and the second ultrasonic transceiver are arranged on the same straight line of the pipe.

Advantages of the Invention

According to the ultrasonic flowmeter of the present invention, the main unit is formed to fit on the pipe at an angle to the axis of the pipe in which fluid flows so that the components parallel to the pipe axis regarding the velocity of the fluid may be accurately calculated on the basis of the first propagation time difference and the second propagation time difference even when the fluid velocity contains components that are perpendicular to the pipe axis. Therefore, the ultrasonic flowmeter may accurately measure the fluid flow rate on the basis of the components of the fluid velocity that are parallel to the pipe axis.

There is also no need to arrange a long straight pipe in the upstream side to limit the effects of components perpendicular to the pipe axis regarding the velocity of the fluid. Therefore, the ultrasonic flowmeter eases constraints (restrictions) on placement locations and may be placed at any desired location such as immediately after curved pipe, for example.

Additionally, increases in the dimensions (length in the axial direction of the pipe) of the first ultrasonic transceiver and the second ultrasonic transceiver do not cause the two to interfere with each other preventing (blocking) fitment. Therefore, the measurable fluid velocity range of the ultrasonic flowmeter may be readily increased by increasing the dimensions (length in the axial direction of the pipe) of the first ultrasonic transceiver and the second ultrasonic transceiver.

Pipe propagation waves are less likely to be received in comparison with a scenario in which the first ultrasonic transceiver and the second ultrasonic transceiver are arranged on the same straight line of the pipe. Therefore, the ultrasonic flowmeter may improve the SN ratio.

According to the flow velocity measurement method of the present invention, the main unit may accurately calculate the components parallel to the pipe axis regarding the velocity of the fluid on the basis of the first propagation time difference and the second propagation time difference even when the fluid flows at an angle in relation to the pipe axis and the fluid velocity contains components that are perpendicular to the pipe axis. Therefore, the ultrasonic flowmeter may accurately measure the fluid flow rate on the basis of the components of the fluid velocity that are parallel to the pipe axis.

There is also no need to arrange a long straight pipe in the upstream side to limit the effects of components of the fluid velocity that are perpendicular to the pipe axis. Therefore, the ultrasonic flowmeter eases constraints (restrictions) on placement locations and may be placed at any desired location such as immediately after curved pipe, for example.

Additionally, increases in the dimensions (length in the axial direction of the pipe) of the first ultrasonic transceiver and the second ultrasonic transceiver do not cause the two to interfere with each other preventing (blocking) fitment. Therefore, the measurable range of the fluid velocity of the ultrasonic flowmeter may be readily increased by increasing the dimensions (length in the axial direction of the pipe) of the first ultrasonic transceiver and the second ultrasonic transceiver.

Pipe propagation waves are less likely to be received in comparison with a scenario in which the first ultrasonic transceiver and the second ultrasonic transceiver are arranged on the same straight line of the pipe. Therefore, the ultrasonic flowmeter may improve the SN ratio.

According to the flow velocity measurement program of the present invention, the main unit is formed to fit on the pipe at an angle to the axis of the pipe in which fluid flows so that the components parallel to the pipe axis regarding the velocity of the fluid may be accurately calculated on the basis of the first propagation time difference and the second propagation time difference even when the fluid velocity contains components that are perpendicular to the pipe axis. Therefore, the ultrasonic flowmeter may accurately measure the fluid flow rate on the basis of the components parallel to the pipe axis regarding the velocity of the fluid.

There is also no need to arrange a long straight pipe in the upstream side to limit the effects of components perpendicular to the pipe axis regarding the velocity of the fluid. Therefore, the ultrasonic flowmeter eases constraints (restrictions) on placement locations and may be placed at any desired location such as immediately after curved pipe, for example.

Additionally, increases in the dimensions (length in the axial direction of the pipe) of the first ultrasonic transceiver and the second ultrasonic transceiver do not cause the two to interfere with each other preventing (blocking) fitment. Therefore, the measurable fluid velocity range of the ultrasonic flowmeter may be readily increased by increasing the dimensions (length in the axial direction of the pipe) of the first ultrasonic transceiver and the second ultrasonic transceiver.

Pipe propagation waves are less likely to be received in comparison with a scenario in which the first ultrasonic transceiver and the second ultrasonic transceiver are arranged on the same straight line of the pipe. Therefore, the ultrasonic flowmeter may improve the SN ratio.

DESCRIPTION OF THE EMBODIMENTS

Figure 1:
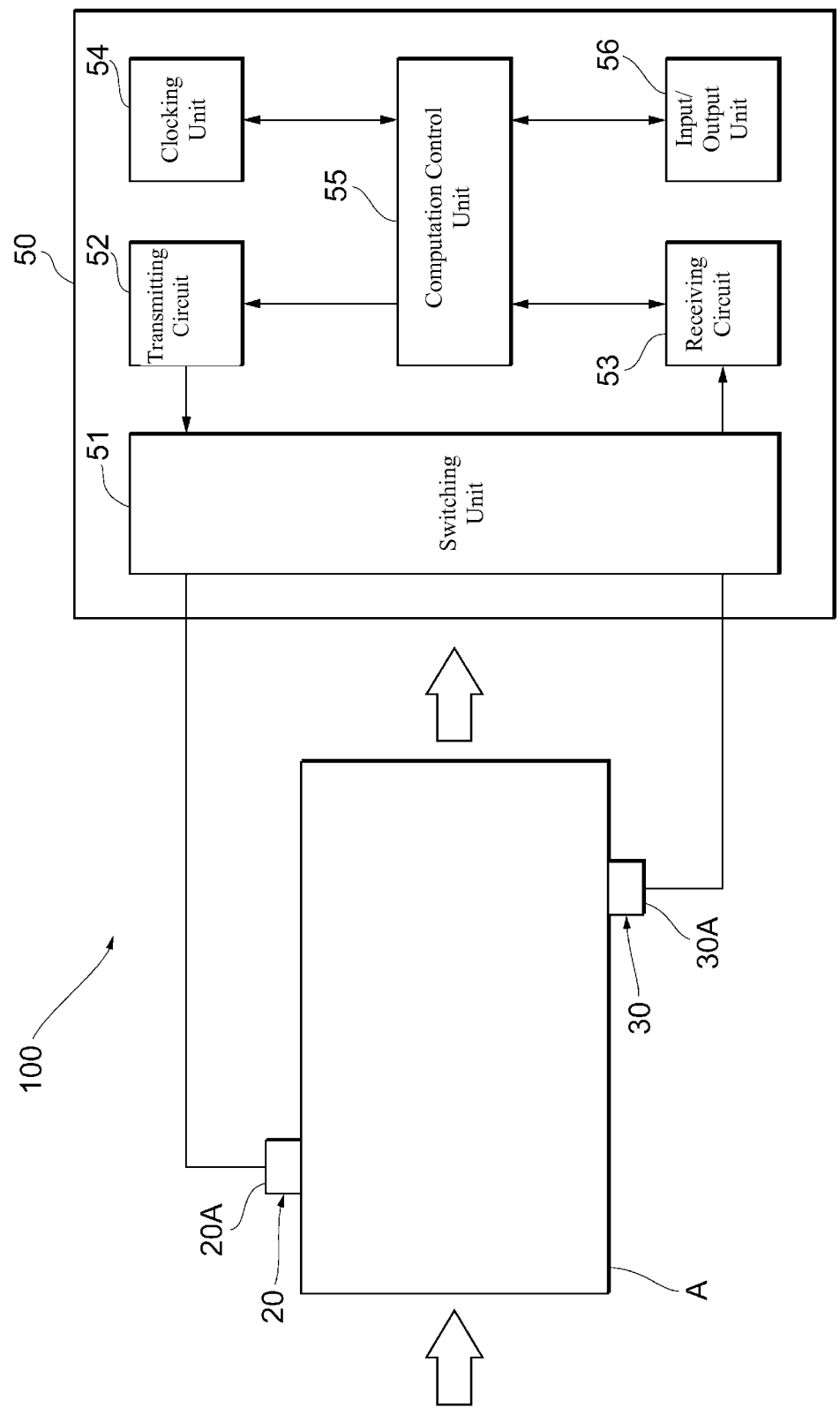
FIG. 1 is a configuration diagram illustrating an overall configuration of an ultrasonic flowmeter according to a first Embodiment.

The embodiments of the present invention are described as follows. The same or similar reference numerals are used to represent the same or similar elements illustrated in the following drawings. Note that the drawings are schematic diagrams. Therefore, actual dimensions and other specific information must be determined with reference to the following description. Note that dimensional relationships and ratios of corresponding elements between drawings may be different. The following terms in the description refer to corresponding orientations on the drawings: top refers to the top side of the drawing, bottom refers to the bottom side of the drawing, left refers to the left side of the drawing, and right refers to the right side of the drawing.

First Embodiment

FIG. 1 through FIG. 15 illustrates a first Embodiment of an ultrasonic flowmeter, flow velocity measurement method and flow velocity measurement program according to the present invention. FIG. 1 is a configuration diagram illustrating an overall configuration of an ultrasonic flowmeter 100 according to a first Embodiment. As illustrated in FIG. 1, the ultrasonic flowmeter 100 measures fluids flowing through a pipe A such as gases or liquids, for example. The pipe A (tube body) is made, for example, from metal such as stainless steel (SUS) or from plastic materials. The pipe A is arranged so that the axis of the pipe A (longitudinal direction) aligns with the horizontal direction of FIG. 1 and the diameter of the pipe A (lateral direction) aligns with the vertical direction of FIG. 1. The fluid measured by the ultrasonic flowmeter 100 flows in the direction (direction from left to right in FIG. 1) as illustrated by the hollow arrow in FIG. 1. The ultrasonic flowmeter 100 is equipped with a first ultrasonic transceiver 20, a second ultrasonic transceiver 30, and a main unit 50.

The first ultrasonic transceiver 20 and the second ultrasonic transceiver 30 both transmit and receive ultrasonic waves. The first ultrasonic transceiver 20 is fitted to a predetermined position on the pipe A, and the second ultrasonic transceiver 30 is fitted to the pipe A downstream (right side of FIG. 1) from the first ultrasonic transceiver 20. In other words, the first ultrasonic transceiver 20 is fitted to the pipe A upstream (left side of FIG. 1) from the second ultrasonic transceiver 30. The first ultrasonic transceiver 20 and the second ultrasonic transceiver 30 are arranged facing each other to sandwich the fluid flowing in the pipe A.

The first ultrasonic transceiver 20 arranged in the upstream side of the pipe A is equipped with a first ultrasonic sensor 20A fitted to the outer circumference of the pipe A, for example. The second ultrasonic transceiver 30 arranged in the downstream side of the pipe A is equipped with a second ultrasonic sensor 30A fitted to the outer circumference of the pipe A, for example. As a result, the first ultrasonic transceiver 20 and the second ultrasonic transceiver 30 that transmits and receives ultrasonic waves may be readily fitted to the pipe A without any piping construction or modification.

The first ultrasonic sensor 20A and the second ultrasonic sensor 30A transmit and receive ultrasonic waves to each other. In other words, the ultrasonic waves transmitted by the first ultrasonic sensor 20A are received by the second ultrasonic sensor 30A, and the ultrasonic waves transmitted by the second ultrasonic sensor 30A are received by the first ultrasonic sensor 20A.

Figure 2:
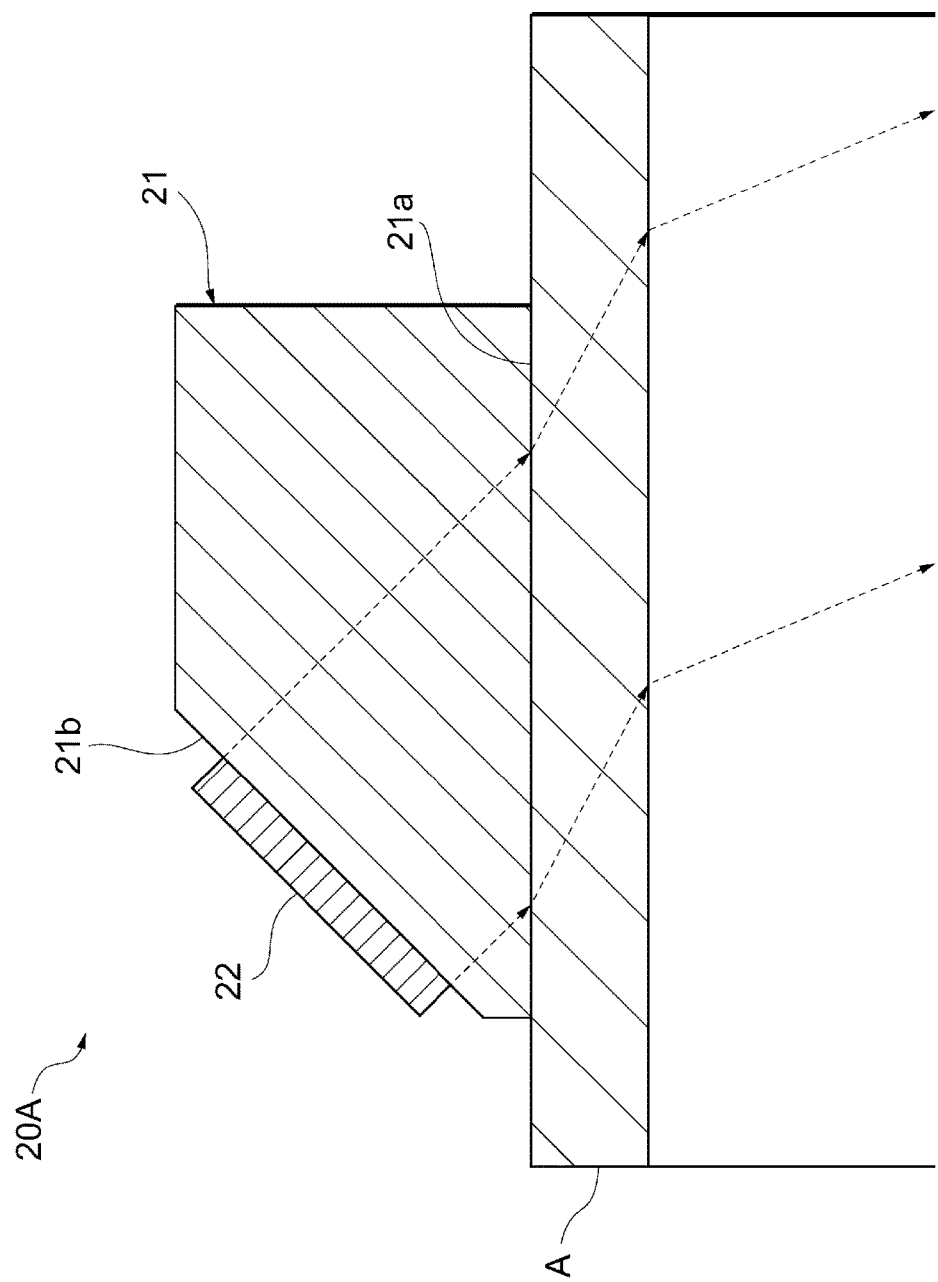
FIG. 2 is an expanded cross-sectional diagram describing a configuration of a first ultrasonic sensor illustrated in FIG. 1.

FIG. 2 is an expanded cross-sectional diagram describing a configuration of the first ultrasonic sensor 20A illustrated in FIG. 1. As illustrated in FIG. 2, the first ultrasonic sensor 20A is equipped with a wedge 21 and an ultrasonic transceiver 22.

The wedge 21 is intended to direct ultrasonic waves at a predetermined angle in relation to the pipe A and may be made from plastic materials or metal, for example. The wedge 21 is fitted so that a bottom surface 21a makes contact with the outer circumference of the pipe A. The wedge 21 is also formed with a slope 21b of a predetermined angle in relation to the bottom surface 21a. The ultrasonic transceiver 22 is fitted on the slope 21b.

According to the present embodiment, the example illustrated has the bottom surface 21a making direct contact with the outer circumference of the pipe A, but the present invention is not restricted thusly. A couplant may be placed between the bottom surface 21a of the first ultrasonic sensor 20A and the outer circumference of the pipe A.

The ultrasonic transceiver 22 both transmits and receives ultrasonic waves. The ultrasonic transceiver 22 may be configured with a piezoelectric element, for example. The ultrasonic transceiver 22 is electrically connected to a lead wire (not illustrated). When an electric signal of a predetermined frequency is applied via the lead wire, the ultrasonic transceiver 22 vibrates at the predetermined frequency to emit ultrasonic waves. As a result, ultrasonic waves are transmitted by the ultrasonic transceiver 22. As illustrated by the dashed-line arrows in FIG. 2, the ultrasonic waves transmitted in accordance with the dimensions of the ultrasonic transceiver 22 (horizontal and vertical lengths) are propagated by the angle of the slope 21b. The ultrasonic waves propagated by the wedge 21 are refracted by the boundary between the wedge 21 and the pipe A, which changes the angle of incidence, and then are further refracted by the boundary between the inner wall of the pipe A and the inside of the pipe A, which further changes the angle of incidence, as they propagate through the fluid. The refraction at boundaries occurs in accordance with Snell's law, and so the wedge 21 directs ultrasonic waves into the fluid flowing in the pipe A at a predetermined angle by pre-configuring the angle of the slope 21b on the basis of the velocity of ultrasonic waves propagating through the pipe A and the velocity of the ultrasonic waves propagating through the fluid.

Conversely, when the ultrasonic waves reach the ultrasonic transceiver 22, the ultrasonic transceiver 22 vibrates at the frequency of the ultrasonic waves to generate an electrical signal. As a result, ultrasonic waves are received by the ultrasonic transceiver 22. The electrical signal generated by the ultrasonic transceiver 22 is detected by the main unit 50, which is described later, via the lead wire.

The second ultrasonic sensor 30A is also configured similarly to the first ultrasonic sensor 20A. That is to say, the second ultrasonic sensor 30A is also equipped with the wedge 21 and the ultrasonic transceiver 22. Thus, a detailed description of the second ultrasonic sensor 30A is omitted, as it is virtually the same as that for the first ultrasonic sensor 20A.

The main unit 50 illustrated in FIG. 1 measures the velocity of fluid flowing in the pipe A. The main unit 50 is equipped with a switching unit 51, transmitting circuit 52, receiving circuit 53, clocking unit 54, computation control unit 55, and an input/output unit 56.

The switching unit 51 switches between the transmission and reception of ultrasonic waves. The switching unit 51 is connected to the first ultrasonic sensor 20A and the second ultrasonic sensor 30A. The switching unit 51 may be configured to include a switch, for example. The switching unit 51 switches the switch on the basis of a control signal input from the computation control unit 55 and connects either the first ultrasonic sensor 20A or the second ultrasonic sensor 30A to the transmitting circuit 52 while also connecting the other of either the first ultrasonic sensor 20A or the second ultrasonic sensor 30A to the receiving circuit 53. As a result, either the first ultrasonic sensor 20A or the second ultrasonic sensor 30A may transmit ultrasonic waves and the other of either the first ultrasonic sensor 20A or the second ultrasonic sensor 30A may receive the ultrasonic waves.

The transmitting circuit 52 transmits ultrasonic waves to the first ultrasonic sensor 20A and the second ultrasonic sensor 30A. The transmitting circuit 52 may be configured, for example, to include an oscillator circuit that generates a square wave at a predetermined frequency and a drive circuit to drive the first ultrasonic sensor 20A and the second ultrasonic sensor 30A. The oscillator circuit in the transmitting circuit 52 generates a square wave on the basis of a control signal input from the computation control unit 55, and the drive circuit outputs this square wave as a drive signal to the ultrasonic transceiver 22 in either the first ultrasonic sensor 20A or the second ultrasonic sensor 30A. As a result, the ultrasonic transceiver 22 in either the first ultrasonic sensor 20A or the second ultrasonic sensor 30A is driven so that the ultrasonic transceiver 22 transmits ultrasonic waves.

Generally, the ultrasonic waves are sound waves in a frequency band of at least 20 [kHz]. Thus, the ultrasonic waves transmitted by the ultrasonic transceiver 22 are sound waves in a frequency band of at least 20 [kHz]. Preferably, the sound waves transmitted by the ultrasonic transceiver 22 are sound waves in a frequency band between 100 [kHz] to 2.0 [MHz]. Regardless, the ultrasonic waves transmitted by the ultrasonic transceiver 22 in the first ultrasonic sensor 20A and the ultrasonic waves transmitted by the second ultrasonic sensor 30A may be either set to the same or a different frequency.

The receiving circuit 53 detects ultrasonic waves received by the first ultrasonic sensor 20A and the second ultrasonic sensor 30A. The receiving circuit 53 may be configured, for example, to include an amplifying circuit to amplify the signal by a predetermined gain and a filter circuit to filter a predetermined frequency of electrical signal. The receiving circuit 53 amplifies the electrical signal output from the ultrasonic transceiver 22 of either the first ultrasonic sensor 20A or the second ultrasonic sensor 30A on the basis of a control signal input from the computation control unit 55, filters and then converts the signal into a receive signal. The receiving circuit 53 outputs the converted receive signal to the computation control unit 55.

The clocking unit 54 calculates the time that elapses during a predetermined period. The clocking unit 54 may be configured, for example, with an oscillator circuit. The oscillator circuit may also be shared with the transmitting circuit 52. The clocking unit 54 measures time by counting the number of reference waves from the oscillator circuit on the basis of a start signal and stop signal input from the computation control unit 55. The clocking unit 54 outputs the calculated time to the computation control unit 55.

The computation control unit 55 computes the flow rate of fluid flowing in the pipe A by performing calculations. The computation control 55 may be configured, for example, with a CPU, memory such as ROM and RAM, input/output interfaces, and similar. The computation control unit 55 also controls each component of the main unit 50 such as the switching unit 51, transmitting circuit 52, receiving circuit 53, clocking unit 54, and the input/output unit 56.

The input/output unit 56 inputs information from users and outputs information to users. The input/output unit 56 is configured, for example, with an input unit such as operation buttons and an output unit such as a display. Settings and other types of information are generated from user operation of operation buttons or similar and then input into the computation control unit 55 via the input/output unit 56. The input/output unit 56 also outputs information, such as the flow rate of fluid and flow velocity calculated by the computation control unit 55 and the accumulated time during a predetermined period to the user via a display or similar.

Regarding the description of the following FIG. 3, FIG. 4, and FIG. 6 through FIG. 15, except where otherwise stated, the direction parallel to the pipe A axis is referred to as the x axis (or direction in the x axis), the direction perpendicular to the x axis and paralleled to the diameter of the pipe A is referred to as the y axis (or direction in the y axis), and the direction perpendicular to the x axis and the y axis is referred to as the z axis (or direction in the z axis).

Regarding the description of the following FIG. 3, FIG. 4, and FIG. 6 through FIG. 15, except where other stated, the fluid velocity is represented as V [m/s], the velocity by which the ultrasonic waves propagate through the fluid (hereinafter, referred to as sound velocity) is referred to as C [m/s], the length of the propagation path of the ultrasonic waves propagating through the fluid is referred to as L [m], and the angle formed from the propagation path of the ultrasonic waves and the direction parallel to the pipe A axis, the inner wall of the pipe A for example, is referred to as θ.

Figure 3:
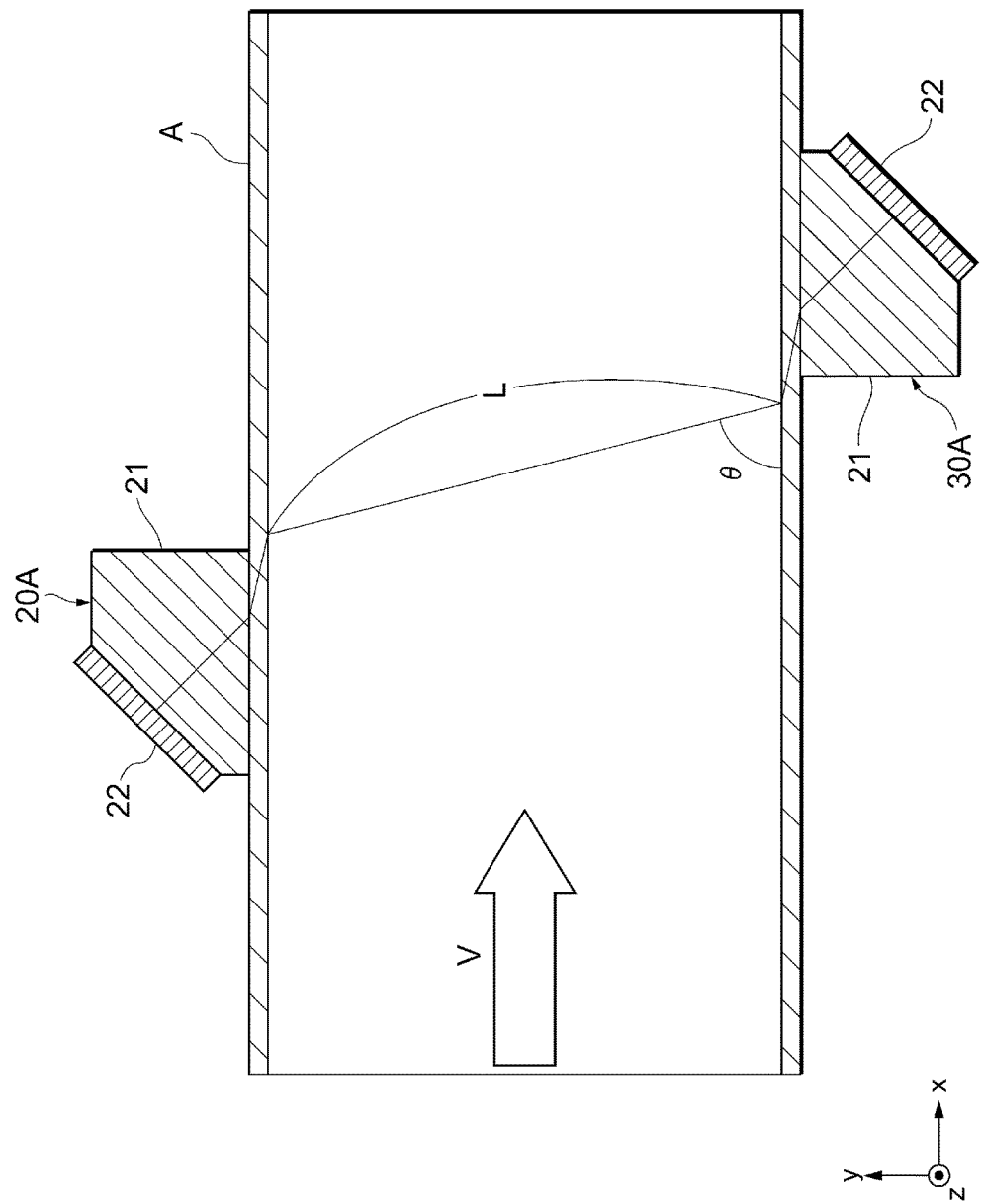
FIG. 3 is a side cross-sectional diagram describing the method to calculate the velocity of fluid flowing in a pipe in a direction parallel to the pipe axis.

FIG. 3 is a side cross-sectional diagram describing the method to calculate the velocity of fluid flowing in the pipe A in a direction parallel to the pipe A axis. As illustrated in FIG. 3, the fluid flows at a velocity V along the x axis in the pipe A. Here, when the first ultrasonic sensor 20A arranged in the upstream side of the pipe A (left side of FIG. 3) transmits ultrasonic waves, and the second ultrasonic sensor 30A arranged in the downstream side of the pipe A (right side of FIG. 3) receives the ultrasonic waves, a propagation time $t_{1d}$ for the ultrasonic waves to propagate through the pipe A is expressed by the following Expression (1).

$$t_{1d}=L/(C+V\cos\theta) \quad (1)$$

Conversely, when the second ultrasonic sensor 30A arranged in the downstream side of the pipe A transmits ultrasonic waves, and the first ultrasonic sensor 20A arranged in the upstream side of the pipe A receives the ultrasonic waves, a propagation time $t_{1u}$ for the ultrasonic waves to propagate through the pipe A is expressed by the following Expression (2).

$$t_{1u}=L/(C-V\cos\theta) \quad (2)$$

From Expression (1) and Expression (2), a propagation time difference $\Delta t_1$ ($=t_{1u}-t_{1d}$) of the propagation time $t_{1u}$ and the propagation time $t_{1d}$ is expressed by the following Expression (3).

$$\Delta t_1 = 2LV \cos\theta / (C^2 - V^2 \cos\theta^2) \quad (3)$$

Here, for example, a sound velocity C is approximately 1,500 [m/s] when the fluid is water (liquid) and 343 [m/s] when the fluid is air (gas). Conversely, the velocity V of the fluid measured by the ultrasonic flowmeter 100 is approximately 30 [m/s] at its maximum. For this reason, the value of $V^2 \cos\theta^2$ in the denominator of Expression (3) is extremely small compared to the square of the sound velocity C, and so it is generally considered that this value may be removed. In which case, a propagation time difference $\Delta t_1$ may be expressed by the following Expression (4).

$$\Delta t_1 = 2LV \cos\theta / C^2 \quad (4)$$

From Expression (4), the velocity V of the fluid is expressed by the following Expression (5).

$$V = C^2 \cdot \Delta t_1 / 2LV \cos\theta \quad (5)$$

As the sound velocity C, propagation path length L, and angle $\theta$ in Expression (5) are known values prior to the measurement of the fluid velocity, the velocity V of fluid may be calculated by Expression (5) by measuring a propagation time difference $\Delta t_1$.

A flow rate Q [m³/s] of fluid flowing in the pipe A is expressed by the following Expression (6) using a correction coefficient K, cross-sectional area S [m²] of pipe A, and the velocity V [m/s] of the fluid.

$$Q = KSV \quad (6)$$

Therefore, when the fluid is flowing along the x axis in the pipe A, the computation control unit 55 may calculate the flow rate Q of the fluid flowing in the pipe A using Expression (6) on the basis of the velocity V of the fluid calculated with Expression (5).

Figure 4:
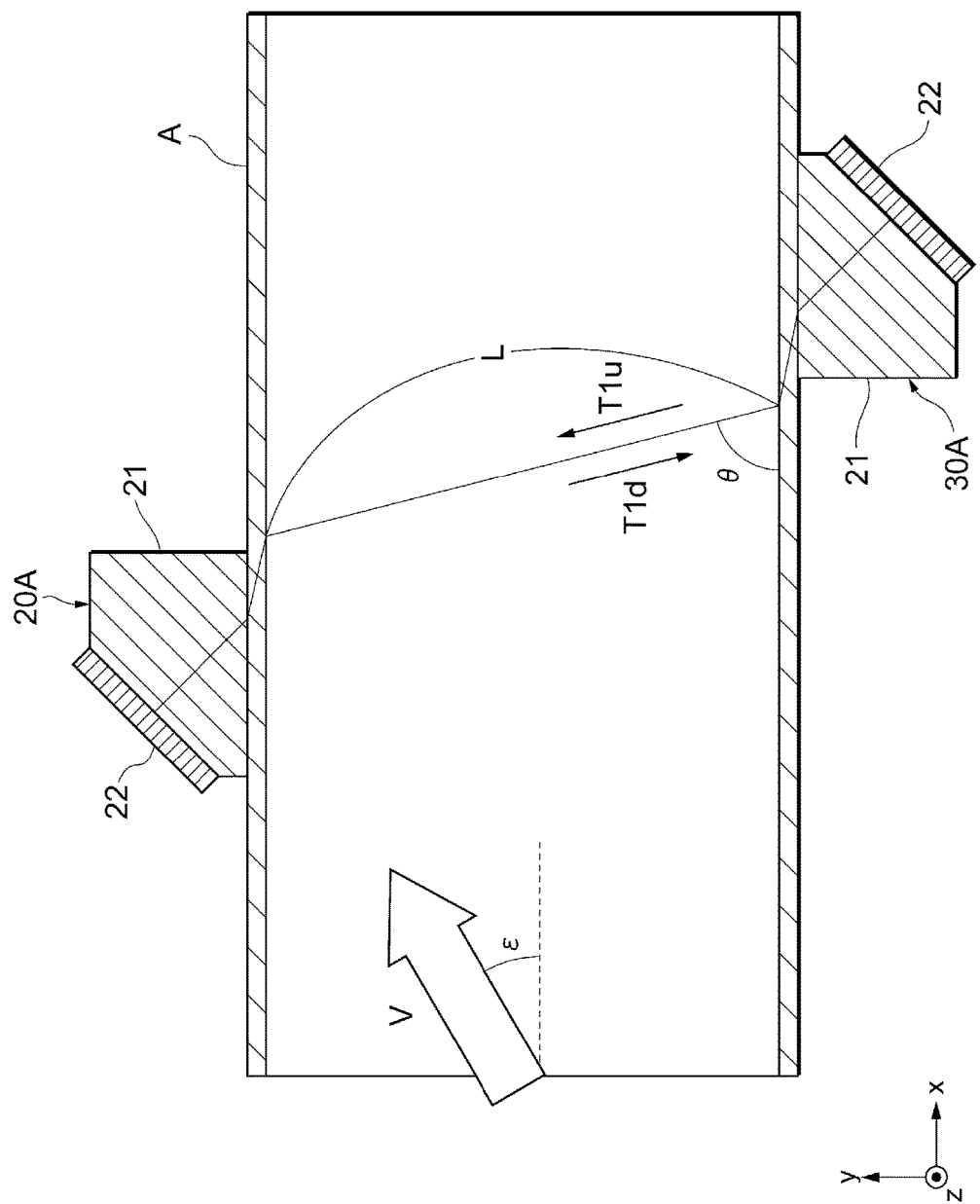
FIG. 4 is a side cross-sectional diagram describing the method to calculate the velocity of fluid flowing in a pipe in a direction parallel to the pipe axis.

FIG. 4 is a side cross-sectional diagram describing the method to calculate the velocity of fluid flowing in a pipe at an angle in relation to the pipe A axis. As illustrated in FIG. 4, the fluid flows at an angle $\epsilon$ in relation to the pipe A axis (x axis), and the velocity V of the fluid contains components in a direction (y axis) perpendicular to the pipe A axis (x axis). In this case, when the first ultrasonic sensor 20A arranged in the upstream side of the pipe A (left side of FIG. 4) transmits ultrasonic waves, and the second ultrasonic sensor 30A arranged in the downstream side of the pipe A (right side of FIG. 4) receives the ultrasonic waves, a propagation time $T_{1d}$ for the ultrasonic waves to propagate through the pipe A is expressed by the following Expression (11).

$$T_{1d} = L/\{C + V \cos(\theta+\epsilon)\} \quad (11)$$

Conversely, when the second ultrasonic sensor 30A arranged in the downstream side of the pipe A transmits ultrasonic waves, and the first ultrasonic sensor 20A arranged in the upstream side of the pipe A receives the ultrasonic waves, a propagation time $T_{1u}$ for the ultrasonic waves to propagate through the pipe A is expressed by the following Expression (12).

$$T_{1u} = L/\{C - V \cos(\theta+\epsilon)\} \quad (12)$$

From Expression (11) and Expression (12), a propagation time difference $\Delta T_1$ ($=T_{1u}-T_{1d}$) of the propagation time $T_{1u}$ and the propagation time $T_{1d}$ is expressed by the following Expression (13).

$$\Delta T_1 = 2LV \cos(\theta+\epsilon) / \{C^2 - V^2 \cos(\theta+\epsilon)^2\} \quad (13)$$

Here, as with the previously described Expression (3), the value of $V^2 \cos(\theta+\epsilon)^2$ in the denominator of Expression (13) is extremely small compared to the square of the sound velocity C, and so it is generally considered that this value may be removed. In which case, a propagation time difference $\Delta T_1$ may be expressed by the following Expression (14).

$$\Delta T_1 = 2LV \cos(\theta+\epsilon) / C^2 \quad (14)$$

From Expression (14), the velocity V of the fluid is expressed by the following Expression (15).

$$V = C^2 \cdot \Delta T_1 / 2L \cos(\theta+\epsilon) \quad (15)$$

While the propagation path length L and angle $\theta$ in Expression (15) are known values prior to measurement of the fluid velocity, the angle $\epsilon$ is not known prior to the measurement of the fluid velocity. It is also difficult to measure the angle $\epsilon$ while measuring the fluid velocity. In addition, as even a slight angle $\epsilon$ in the fluid has a significant impact on velocity in Expression (15) it is difficult to calculate the velocity V for the fluid with Expression (15).

For this reason, according to conventional ultrasonic flowmeters, the first ultrasonic sensor 20A was arranged on a sufficiently long straight pipe further upstream (left side of FIG. 4) to reduce the angle $\epsilon$ in the fluid flowing in the pipe A and enable the fluid to flow in the direction parallel to the pipe A axis.

Next, the operation by which the ultrasonic flowmeter 100 measures the fluid velocity will be described.

Figure 5:
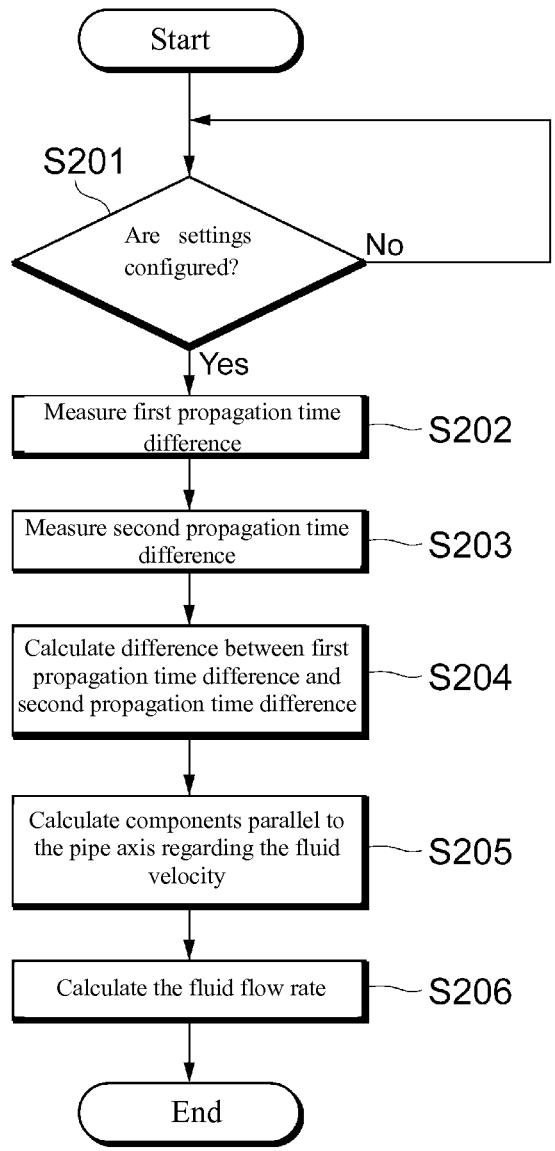
FIG. 5 is a flowchart describing an example of the operation by which the ultrasonic flowmeter illustrated in FIG. 1 measures the velocity of fluid flowing in a pipe.

FIG. 5 is a flowchart describing an example of the operation by which the ultrasonic flowmeter 100 illustrated in FIG. 1 measures the velocity of fluid flowing in a pipe.

The computation control unit 55 reads a program stored in ROM when the ultrasonic flowmeter 100 starts up, for example, and executes a fluid velocity measuring process S200 as illustrated in FIG. 5.

First, the computation control unit 55 determines whether predetermined settings are configured (S201). The computation control unit 55 repeats step S201 until predetermined settings are configured.

Examples of the predetermined settings include the sound velocity C, propagation path length L, angle $\theta$, correction coefficient K, and the cross-sectional S of the pipe A. Before the fluid velocity is measured, the user inputs information on the pipe A and fluid via the input/output unit 56. The computation control unit 55 reads or calculates the corresponding predetermined settings on the basis of the input information and stores the predetermined settings in non-volatile memory or similar. The computation control unit 55 may perform the determination of step S201 by accessing the memory.

The computation control unit 55 may also display a message to the user prompting for the input of information to an output unit such as a display via the input/output unit 56 while step S201 repeats.

If the determination made in step S201 results in predetermined settings being configured, the computation control unit 55 calculates a first propagation time difference, which is the difference in time for the ultrasonic waves transmitted by the first ultrasonic sensor 20A in the first ultrasonic transceiver 20 to propagate and the time for the ultrasonic waves transmitted by the second ultrasonic sensor 30A in the second ultrasonic transceiver 30 to propagate through the first fluid propagation path that traverses inside the pipe A in the axial direction for a 2n−1 (n is a positive integer) number of times (S202).

Specifically, the computation control unit 55 first outputs a control signal to the switching unit 51, for example, to connect the first ultrasonic sensor 20A to the transmitting circuit 52 while connecting the second ultrasonic sensor 30A to the receiving circuit 53. Then, the computation control unit 55 outputs a control signal to the transmitting circuit 52 to transmit ultrasonic waves from the first ultrasonic sensor 20A while outputting a start signal to the clocking unit 54. Next, the computation control unit 55 outputs a stop signal to the clocking unit 54 on the basis of a receive signal input from the receiving circuit 53 and calculates the propagation time for the ultrasonic waves to propagate through the first fluid propagation path from the upstream side to the downstream side.

Next, the computation control unit 55 outputs a control signal to the switching unit 51, for example, to connect the second ultrasonic sensor 30A to the transmitting circuit 52 while connecting the first ultrasonic sensor 20A to the receiving circuit 53. Then, the computation control unit 55 outputs a control signal to the transmitting circuit 52 to transmit ultrasonic waves from the second ultrasonic sensor 30A while outputting a start signal to the clocking unit 54. Next, the computation control unit 55 outputs a stop signal to the clocking unit 54 on the basis of a receive signal input from the receiving circuit 53 and calculates the propagation time for the ultrasonic waves to propagate through the first fluid propagation path from the downstream side to the upstream side.

Next, the computation control unit 55 obtains the first propagation time for the first fluid propagation path from the upstream side to the downstream side and the propagation time for the first fluid propagation path from the downstream side to the upstream side.

Figure 6:
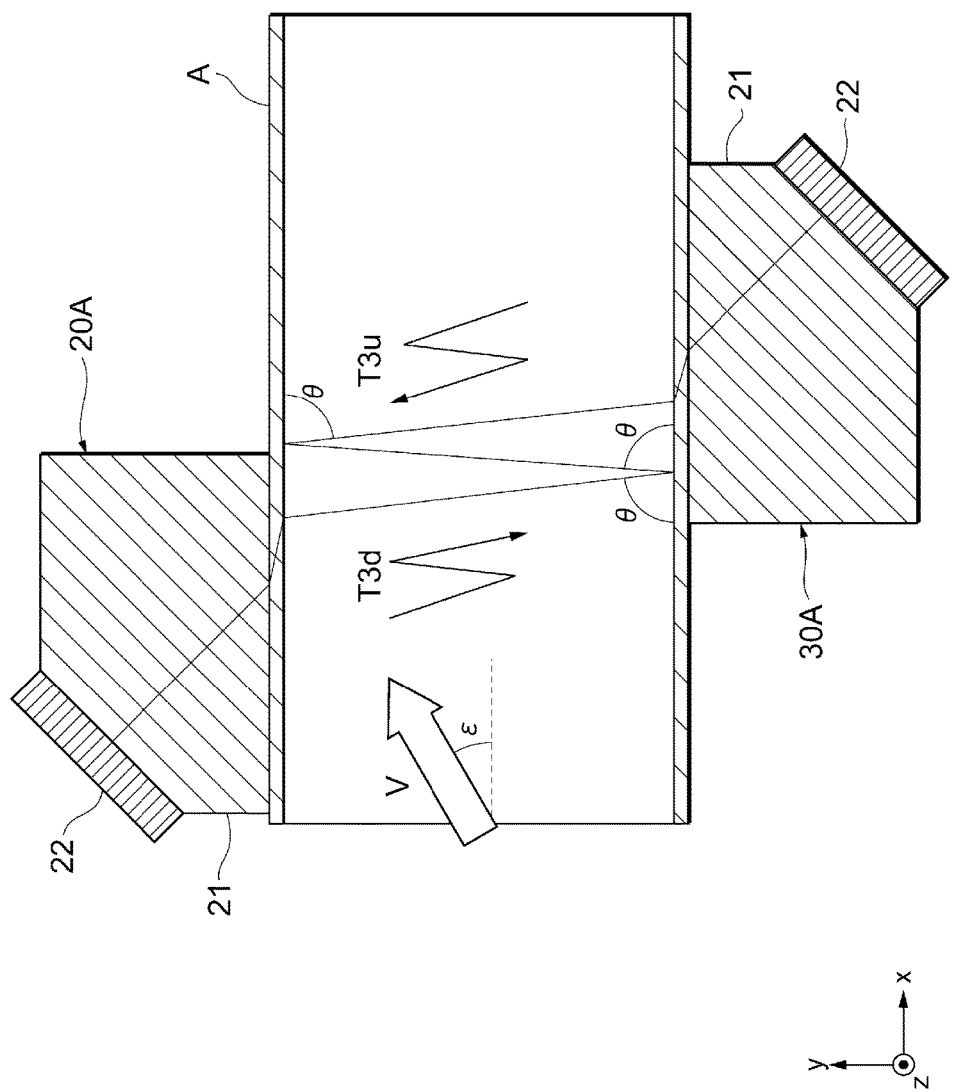
FIG. 6 is a side cross-sectional diagram describing an example of measuring a first propagation time difference for a first fluid propagation path.

FIG. 6 is a side cross-sectional diagram describing an example of measuring a first propagation time difference for a first fluid propagation path. As illustrated in FIG. 6, if n=2 for example, the first fluid propagation path traverses (crosses) inside the pipe A in the radial direction three times. In this case, the computation control unit 55 calculates the propagation time $T_{3d}$ and propagation time $T_{3u}$ as illustrated by the arrows in FIG. 6. The computation control unit 55 also obtains the propagation time difference $\Delta T_3$ $(=T_{3u}-T_{3d})$ as the first propagation time difference from the propagation time $T_{3d}$ and propagation time $T_{3u}$.

As illustrated in FIG. 5, the computation control unit 55 next calculates a second propagation time difference, which is the difference in time for the ultrasonic waves transmitted by the first ultrasonic sensor 20A in the first ultrasonic transceiver 20 to propagate and the time for the ultrasonic waves transmitted by the second ultrasonic sensor 30A in the second ultrasonic transceiver 30 to propagate through a second fluid propagation path that traverses inside the pipe A for a 2m−1 (m is a positive integer other than n) number of times (S203).

Specifically, the computation control unit 55 first outputs a control signal to the switching unit 51, for example, to connect the first ultrasonic sensor 20A to the transmitting circuit 52 while connecting the second ultrasonic sensor 30A to the receiving circuit 53. Then, the computation control unit 55 outputs a control signal to the transmitting circuit 52 to transmit ultrasonic waves from the first ultrasonic sensor 20A while outputting a start signal to the clocking unit 54. Next, the computation control unit 55 outputs a stop signal to the clocking unit 54 on the basis of a receive signal input from the receiving circuit 53 and calculates the propagation time for the ultrasonic waves to propagate through the second fluid propagation path from the upstream side to the downstream side.

Next, the computation control unit 55 outputs a control signal to the switching unit 51, for example, to connect the second ultrasonic sensor 30A to the transmitting circuit 52 while connecting the first ultrasonic sensor 20A to the receiving circuit 53. Then, the computation control unit 55 outputs a control signal to the transmitting circuit 52 to transmit ultrasonic waves from the second ultrasonic sensor 30A while outputting a start signal to the clocking unit 54. Next, the computation control unit 55 outputs a stop signal to the clocking unit 54 on the basis of a receive signal input from the receiving circuit 53 and calculates the propagation time for the ultrasonic waves to propagate through the second fluid propagation path from the downstream side to the upstream side.

Next, the computation control unit 55 obtains the second propagation time for the second fluid propagation path from the upstream side to the downstream side and the propagation time for the second fluid propagation path from the downstream side to the upstream side.

Figure 7:
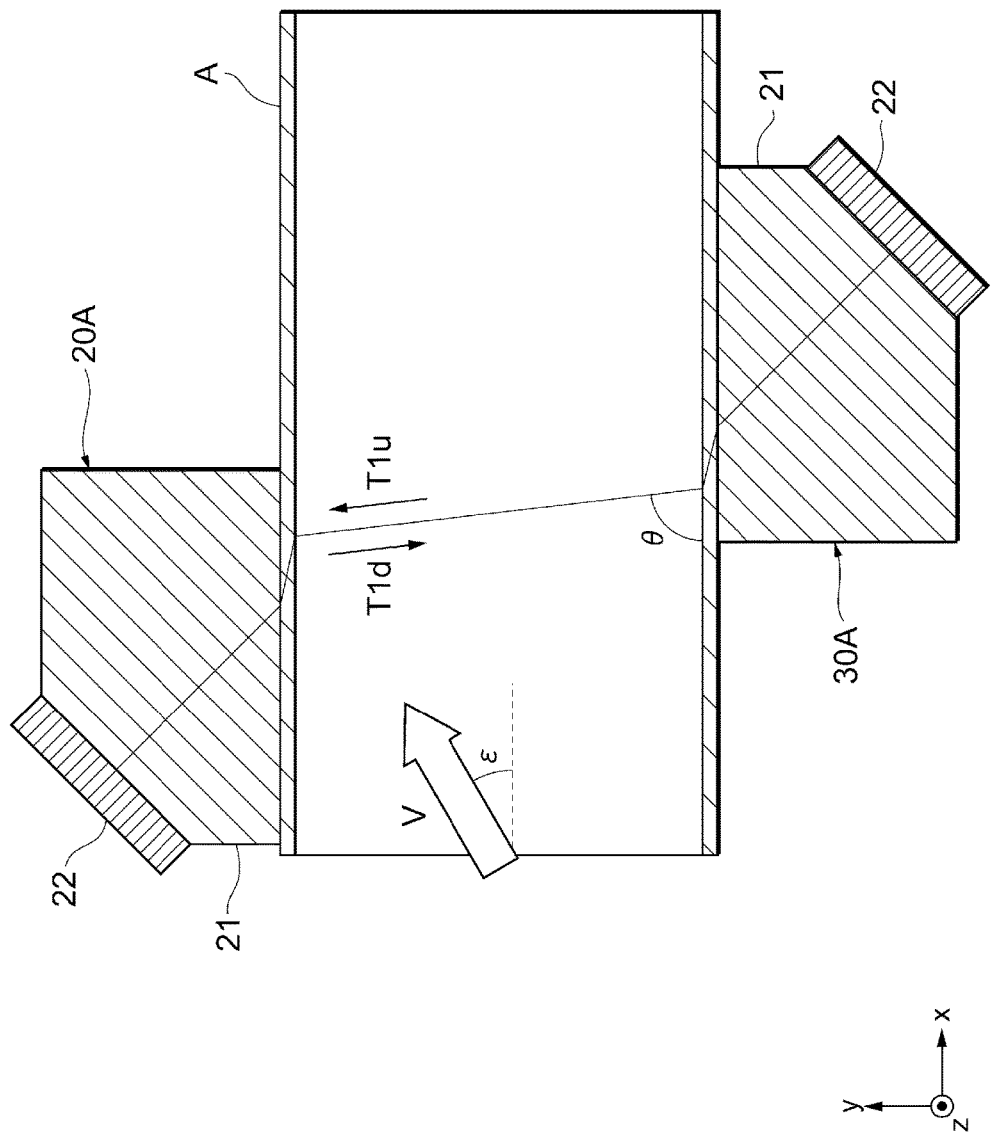
FIG. 7 is a side cross-sectional diagram describing an example of measuring a second propagation time difference for a second fluid propagation path.

FIG. 7 is a side cross-sectional diagram describing an example of measuring a second propagation time difference for a second fluid propagation path. As illustrated in FIG. 7, if m=1 for example, the second fluid propagation path traverses (crosses) inside the pipe A in the radial direction one time. In this case, the computation control unit 55 calculates the propagation time $T_{1d}$ and propagation time $T_{1u}$ as illustrated by the arrows in FIG. 7. The computation control unit 55 also obtains the propagation time difference $\Delta T_1$ $(=T_{1u}-T_{1d})$ as the second propagation time difference from the propagation time $T_{1d}$ and propagation time $T_{1u}$.

As illustrated in FIG. 5, the computation control unit 55 next calculates the difference between the first propagation time calculated in step S202 and the second propagation time calculated in step S203 (S204).

Here, the difference calculated in step S204 corresponds to the difference in time for the ultrasonic waves to propagate from the downstream side to the upstream side and the difference in time for the ultrasonic waves to propagate from the upstream side to the downstream side through the fluid propagation path traversing in the pipe in the radial direction for 2(n−m) times (m does not equal n), which is an even number of times.

Figure 8:
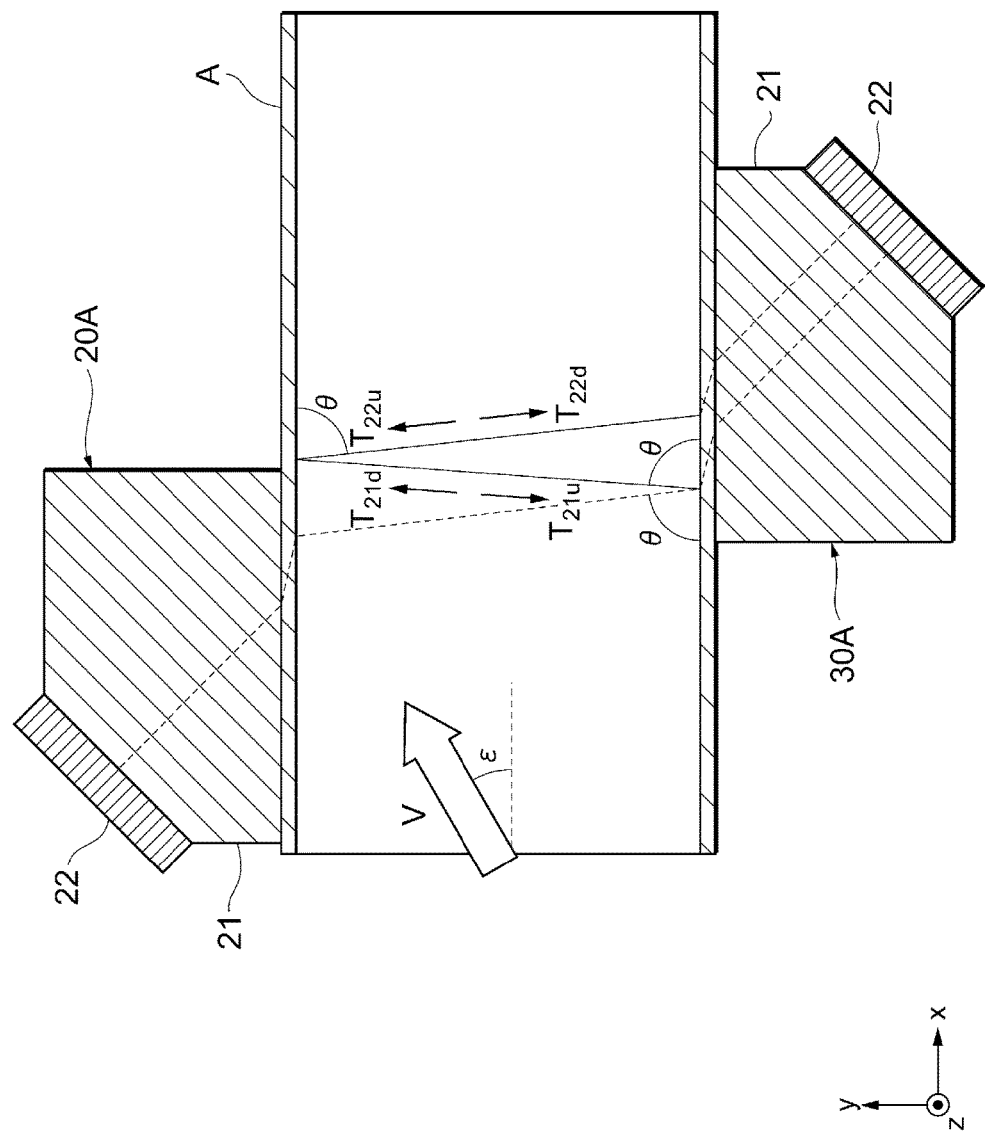
FIG. 8 is a side cross-sectional diagram describing an example of calculating the difference between the first propagation time difference and the second propagation time difference.

FIG. 8 is a side cross-sectional diagram describing an example of calculating the difference between the first propagation time difference and the second propagation time difference. As illustrated in FIG. 6 for example, when the first fluid propagation path traverses (crosses) inside the pipe A in the radial direction three times, and as illustrated in FIG. 7, the second fluid propagation path traverses (crosses) inside the pipe A in the radial direction one time, the difference of path between the first fluid propagation path and the second fluid propagation path traverses (crosses) inside the pipe A two times as illustrated by the solid line inside the pipe A in FIG. 8.

This path that traverses (crosses) inside the pipe A in the radial direction two times may be considered to be divided into two paths. First, regarding the path in which ultrasonic waves are reflected by the inner wall in the pipe A on the downstream side as illustrated in FIG. 8 and traverses the fluid flowing in the pipe A in the radial direction of the pipe A from the bottom to the top, the propagation time $T_{21d}$ for the ultrasonic waves transmitted from the first ultrasonic sensor 20A arranged in the upstream side (left side of FIG.

8) of pipe A to propagate is expressed by the following Expression (21) when the fluid flows at angle ϵ in relation to the pipe A axis.

$$T_{21d}=L/\{C+V\cos(\theta+\epsilon)\} \tag{21}$$

Conversely, regarding the same path, the propagation time $T_{21u}$ for the ultrasonic waves transmitted by the second ultrasonic sensor 30A arranged in the downstream side (left side of FIG. 8) of pipe A to propagate is expressed by the following Expression (22).

$$T_{21u}=L/\{C-V\cos(\theta+\epsilon)\} \tag{22}$$

From Expression (21) and Expression (22), a propagation time difference $\Delta T_{21}$ ($=T_{21u}-T_{21d}$) of the propagation time $T_{21u}$ and the propagation time $T_{21d}$ is expressed by the following Expression (23).

$$\Delta T_{21}=2LV\cos(\theta-\epsilon)/\{C^2-V^2\cos(\theta-\epsilon)^2\} \tag{23}$$

Here, as with the previously described Expression (3) and Expression (13), the value of $V^2\cos(\theta-\epsilon)^2$ in the denominator of Expression (23) is extremely small compared to the square of the sound velocity C, and so it is generally considered that this value may be removed. In which case, a propagation time difference $\Delta T_{21}$ may be expressed by the following Expression (24).

$$\Delta T_{21}=2LV\cos(\theta-\epsilon)/C^2 \tag{24}$$

Next, regarding the path in which ultrasonic waves are reflected by the inner wall in the pipe A on the downstream side as illustrated in FIG. 8 and traverses the fluid flowing in the pipe A in the radial direction of the pipe A from the bottom to the top, the propagation time $T_{22d}$ for the ultrasonic waves transmitted from the first ultrasonic sensor 20A arranged in the upstream side (left side of FIG. 8) of pipe A to propagate is expressed by the following Expression (25) when the fluid flows at angle ϵ in relation to the pipe A axis.

$$T_{22d}=L/\{C+V\cos(\theta-\epsilon)\} \tag{25}$$

Conversely, regarding the same path, the propagation time $T_{22u}$ for the ultrasonic waves transmitted by the second ultrasonic sensor 30A arranged in the downstream side (left side of FIG. 8) of pipe A to propagate is expressed by the following Expression (26).

$$T_{22u}=L/\{C-V\cos(\theta-\epsilon)\} \tag{26}$$

From Expression (25) and Expression (26), a propagation time difference $\Delta T_{22}$ ($=T_{22u}-T_{22d}$) of the propagation time $T_{22u}$ and the propagation time $T_{22d}$ is expressed by the following Expression (27).

$$\Delta T_{22}=2LV\cos(\theta+\epsilon)/\{C^2-V^2\cos(\theta-\epsilon)^2\} \tag{27}$$

Here, as with the previously described Expression (23), the value of $V^2\cos(\theta+\epsilon)^2$ in the denominator of Expression (27) is extremely small compared to the square of the sound velocity C, and so it is generally considered that this value may be removed. In which case, a propagation time difference $\Delta T_{22}$ may be expressed by the following Expression (28).

$$\Delta t_{22}=2LV\cos(\theta+\epsilon)/C^2 \tag{28}$$

Here, when the first propagation time difference measured in step S202 is the propagation time difference $\Delta T_3$ as described with reference to FIG. 6, and the second propagation time difference is the propagation time difference $\Delta T_1$ measured in step S203 as described with reference to FIG. 7, the propagation time difference $\Delta T_2$ ($=\Delta T_3-\Delta T_1$), which is the difference between the propagation time difference $\Delta T_3$ and the propagation time difference $\Delta T_1$, is the total of the propagation time difference $\Delta T_{21}$ and the propagation time difference $\Delta T_{22}$, which is expressed with the following Expression (29) by adding Expression (24) and Expression (28) and using the addition theorem of trigonometric functions.

$$\Delta T_2=2LV(\cos\theta\cos\epsilon+\sin\theta\sin\epsilon+\cos\theta\cos\epsilon-\sin\theta\sin\epsilon)/C^2=4LV\cos\theta\cos\epsilon/C^2 \tag{29}$$

The components that are parallel to the pipe A axis regarding the velocity V of the fluid with angle ϵ in relation to the pipe A axis are represented by V cos ϵ, and so the components V cos ϵ parallel to the pipe A axis regarding the velocity V of the fluid from Expression (29) is expressed with the following Expression (30).

$$V\cos\epsilon=C^2\cdot\Delta T_2/4L\cos\theta \tag{30}$$

Expression (30) is different from the previously described Expression (15) in that there is no section that contains the angle ϵ. The sound velocity C, propagation path length L, and angle θ in Expression (30) are known values prior to the measurement of the fluid velocity, and so the components V cos ϵ parallel to the pipe A axis regarding the velocity V of the fluid may be calculated with Expression (30) on the basis of the propagation time difference $\Delta T_2$.

Thus, as illustrated in FIG. 5, the computation control unit 55 reads the sound velocity C, propagation path length L, and angle θ stored in memory or similar and calculates the components V cos ϵ parallel to the pipe A axis regarding the velocity V of the fluid using the difference calculated in step S204, which is represented by the propagation time difference $\Delta T_2$ and Expression (30), for example (S205).

The flow rate Q [m³/s] of fluid flowing in the pipe A is expressed by the following Expression (31) using a correction coefficient K, cross-sectional area S [m²] of pipe A, and the components V cos ϵ [m/s] parallel to the pipe A axis regarding the velocity V of the fluid.

$$Q=KSV\cos\epsilon \tag{31}$$

Thus, the computation control unit 55 reads the correction coefficient K and cross-sectional area S stored in memory or similar, calculates the flow rate Q of the fluid flowing in the pipe A using the components V cos ϵ parallel to the pipe A axis regarding the velocity V of the fluid calculated in step S205 and Expression (31), and then terminates the fluid velocity measuring process S200.

In the examples illustrated in FIG. 6 through FIG. 8, the first fluid propagation path traverses (crosses) inside the pipe A in the radial direction three times, and the second fluid propagation path traverses (crosses) inside the pipe A in the radial direction one time, but the present invention is not limited thusly.

Figure 9:
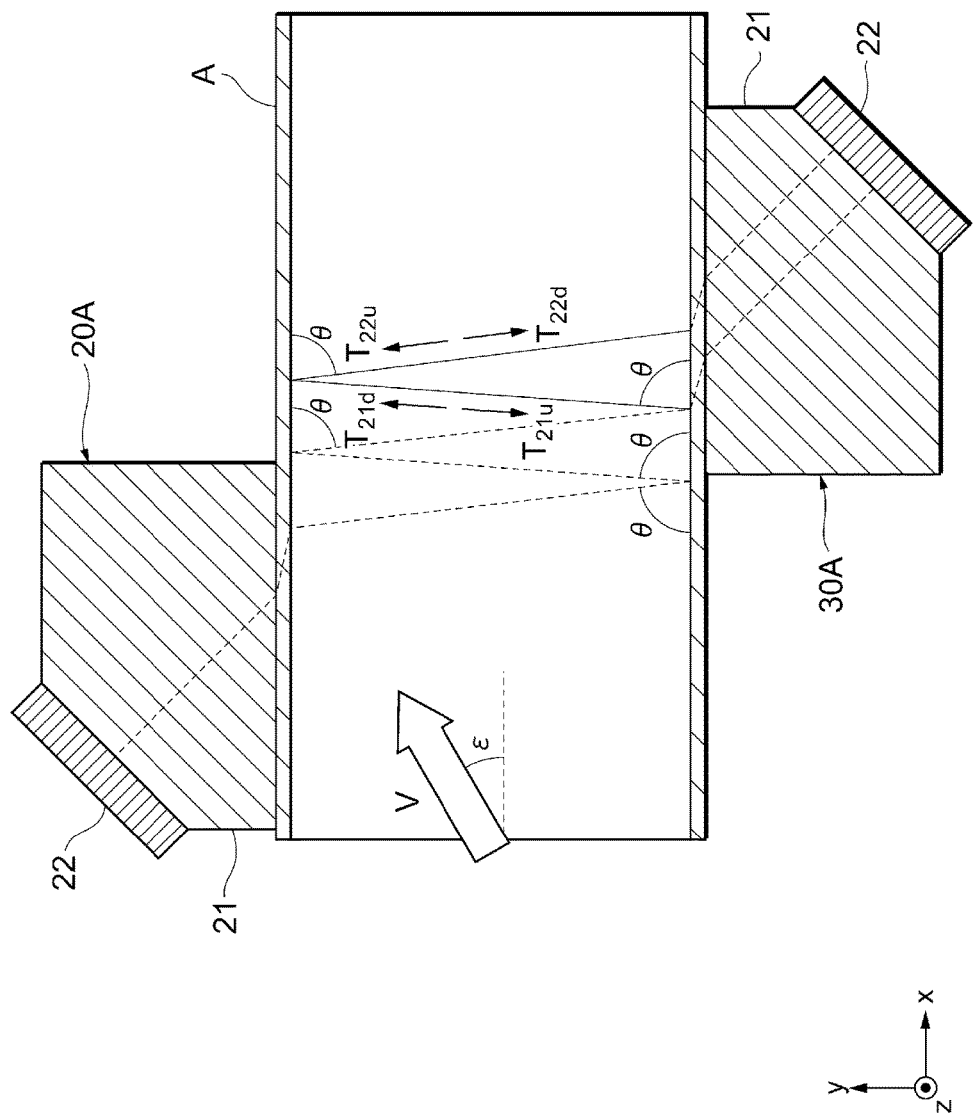
FIG. 9 is a side cross-sectional diagram describing another example of calculating the difference between the first propagation time difference and the second propagation time difference.

FIG. 9 is a side cross-sectional diagram describing another example of calculating the difference between the first propagation time difference and the second propagation time difference. According to the example illustrated in FIG. 9, the first fluid propagation path traverses (crosses) inside the pipe five times in the radial direction, and the second fluid propagation path traverses (crosses) inside the pipe three times in the radial direction. In this case, the path difference between the first fluid propagation path and the second fluid propagation path traverses (crosses) inside the pipe A two times in the radial direction, as illustrated by the solid lines inside the pipe A in FIG. 9, which is similar to that illustrated in FIG. 8.

Thus, as with the example previously described with reference to FIG. 6 through FIG. 8, the computation control unit 55 may calculate, as step S205, the components V cos ε parallel to the pipe A axis regarding the velocity V of the fluid using the time difference calculated in step S204, which is represented by the propagation time difference $\Delta T_2$ and Expression (30), for example.

Figure 10:
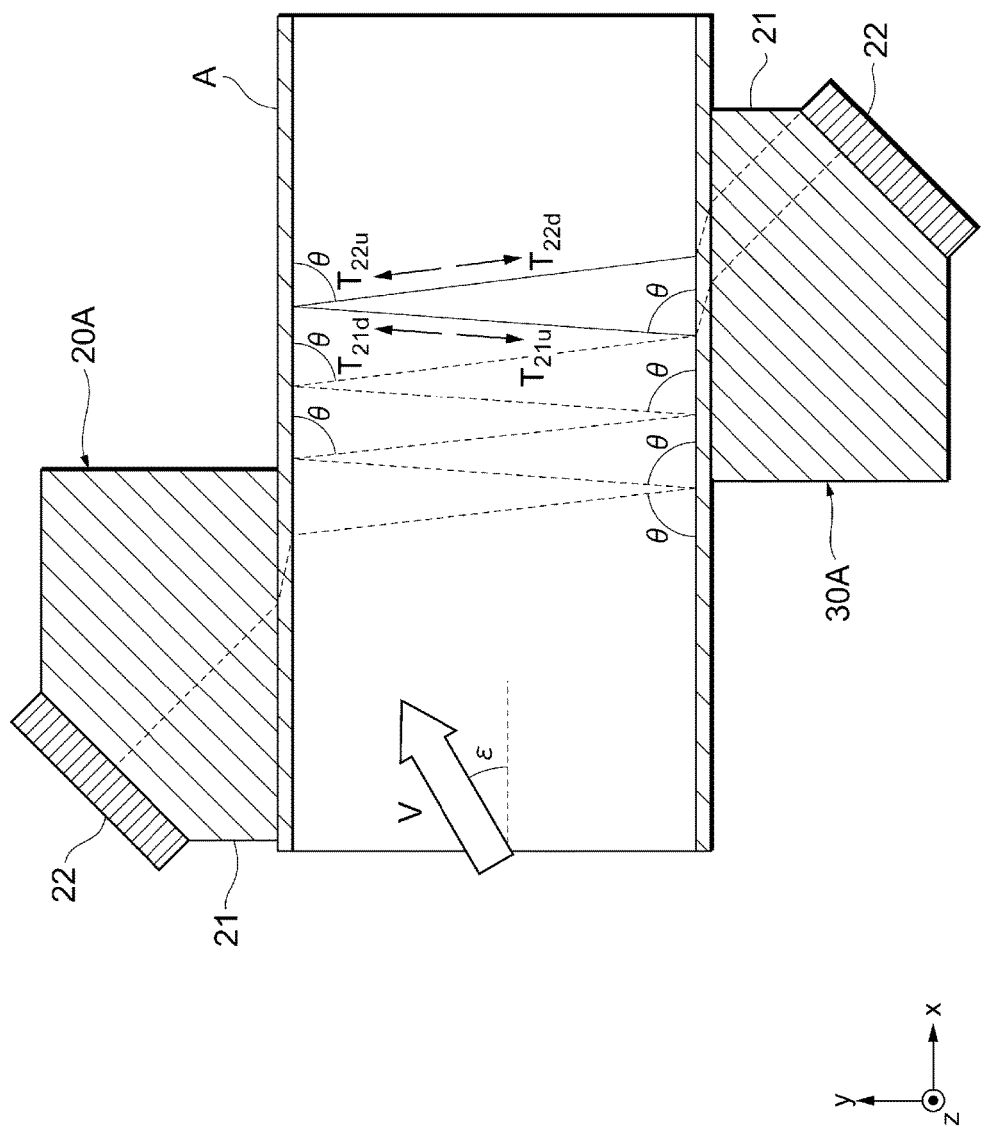
FIG. 10 is a side cross-sectional diagram describing still another example of calculating the difference between the first propagation time difference and the second propagation time difference.

FIG. 10 is a side cross-sectional diagram describing another example of calculating the difference between the first propagation time difference and the second propagation time difference. According to the example illustrated in FIG. 10, the first fluid propagation path traverses (crosses) inside the pipe in the radial direction seven times, and the second fluid propagation path traverses (crosses) inside the pipe in the radial direction five times. In this case, the path difference between the first fluid propagation path and the second fluid propagation path traverses (crosses) the inside of pipe A two times in the radial direction, as illustrated by the solid lines inside the pipe A in FIG. 10, which is similar to that illustrated in FIG. 8 and FIG. 9.

Thus, as with the example previously described with reference to FIG. 6 through FIG. 9, the computation control unit 55 may calculate, as step S205, the components V cos ε parallel to the pipe A axis regarding the velocity V of the fluid using the difference calculated in step S204, which, for example, is represented by the propagation time difference $\Delta T_2$, and Expression (30).

In the examples illustrated in FIG. 8 through FIG. 10, the path difference between the first fluid propagation path and the second fluid propagation path traverses (crosses) inside the pipe A in the radial direction two times, but the present invention is not limited thusly. The path difference between the first fluid propagation path and the second fluid propagation path traverses (crosses) inside the pipe A in the radial direction for a 2(n−m) (m does not equal n) number of times, which is to say, any desired even number of times.

Here, the example path which traverses (crosses) inside pipe A in the radial direction two times can be generalized or expanded to include a scope of meaning represented as a path that traverses (crosses) inside the pipe A in the radial direction for a 2(n−m) (m does not equal n) number of times, which is to say, any desired even number of times.

Regarding the path that traverses (crosses) inside the pipe A in the radial direction for a 2n−1 number of times, when the fluid flows at an angle ε in relation to the pipe A axis, the propagation time $T_{2nd}$ for the ultrasonic waves transmitted from the first ultrasonic sensor 20A arranged in the upstream side is expressed with the following Expression (41) as this time difference $T_{2nd}$ is a sum of the n number of times of the propagation time difference $T_{22d}$ expressed with the previously described Expression (25) and the n−1 times of the propagation time difference $T_{21d}$ expressed with the previously described Expression (21).

$$T_{2nd} = nL/\{C + V\cos(\theta - \epsilon)\} + (n-1)L/\{C + V\cos(\theta + \epsilon)\} \quad (41)$$

Regarding the same path, the propagation time difference $T_{2nu}$ for the ultrasonic waves transmitted from the second ultrasonic sensor 30A arranged in the downstream side is expressed with the following Expression (42) as this time difference $T_{2nu}$ is a sum of the n number of times of the propagation time difference $T_{22u}$ expressed with the previously described Expression (26) and the n−1 times of the propagation time difference $T_{21u}$ expressed with the previously described Expression (22).

$$T_{2nu} = nL/\{C - V\cos(\theta - \epsilon)\} + (n-1)L/\{C - V\cos(\theta + \epsilon)\} \quad (42)$$

From Expression (41) and Expression (42), a propagation time difference $\Delta T_{2n}$ ($= T_{2nu} - T_{2nd}$) of the propagation time $T_{2nu}$ and the propagation time $T_{2nd}$ is expressed by the following Expression (43).

$$\Delta T_{2n} = 2nLV \cos(\theta + \epsilon)/\{C^2 - V^2 \cos(\theta + \epsilon)^2\} + 2(n-1)LV \cos(\theta - \epsilon)/\{C^2 - V^2 \cos(\theta - \epsilon)^2\} \quad (43)$$

Here, as with the previously described Expression (27), the value of $V^2 \cos(\theta + \epsilon)^2$ in the first denominator of Expression (43) is extremely small compared to the square of the sound velocity C, and so it is generally considered that this value may be removed. As with the previously described Expression (23), the value of $V^2 \cos(\theta - \epsilon)^2$ in the second denominator of Expression (43) is extremely small compared to the square of the sound velocity C, and so it is generally considered that this value may be removed. In which case, a propagation time difference $\Delta T_{2n}$ may be expressed by the following Expression (44).

$$\Delta T_{2n} = 2LV\{n \cdot \cos(\theta + \epsilon) + (n-1)\cos(\theta - \epsilon)\}/C^2 \quad (44)$$

The path that traverses (crosses) inside the pipe A in the radial direction for a 2m−1 number of times is similar to the path that traverses (crosses) inside the pipe A in the radial direction for a 2n−1 number of times and so its description is omitted, and the propagation time difference $\Delta T_{2m}$ ($= T_{2mu} - T_{2md}$), which is the difference between the propagation time $T_{2md}$ for the ultrasonic waves transmitted from the first ultrasonic transceiver arranged in the upstream side of the pipe A propagate and the propagation time $T_{2mu}$ for the ultrasonic waves transmitted from the second ultrasonic sensor 30A arranged in the downstream side of the pipe A, is expressed with the following Expression (45).

$$\Delta T_{2m} = 2LV\{m \cdot \cos(\theta + \epsilon) + (m-1)\cos(\theta - \epsilon)\}/C^2 \quad (45)$$

The propagation time difference $\Delta T_{2(n-m)}$ ($= \Delta T_{2n} - \Delta T_{2m}$), which is the difference between the propagation time difference $\Delta T_{2n}$ and the propagation time difference $\Delta T_{2m}$, is expressed with the following Expression (46) using the addition theorem of trigonometric functions with Expression (44) and Expression (45).

$$\Delta T_{2(n-m)} = 2LV(n-m)\{\cos(\theta + \epsilon) + \sin(\theta - \epsilon)\}/C^2 = 4LV(n-m)\cos\theta\cos\epsilon/C^2 \quad (46)$$

The components that are parallel to the pipe A axis regarding the velocity V of the fluid with angle ε in relation to the pipe A axis are represented by V cos ε, and so the components V cos ε parallel to the pipe A axis regarding the velocity V of the fluid from Expression (46) is expressed with the following Expression (47).

$$V \cos \epsilon = C^2 \cdot \Delta T_{2(n-m)}/4L(n-m)\cos\theta \quad (47)$$

As with the previously described Expression (30), the Expression (47) does not have a section that contains the angle ε. The sound velocity C, propagation path length L, angle θ, and value of (n−m) in Expression (47) are known values prior to the measurement of the fluid velocity, and so the components V cos ε parallel to the pipe A axis regarding the velocity V of the fluid may be calculated with Expression (47) on the basis of the propagation time difference $\Delta T_{2(n-m)}$.

Thus, as illustrated with step S205 in FIG. 5, the computation control unit 55 reads the sound velocity C, propagation path length L, and angle θ stored in memory or similar and calculates the components V cos ε parallel to the pipe A axis regarding the velocity V of the fluid using the difference calculated in step S204, which is represented by the propagation time difference $\Delta T_{2(n-m)}$ and Expression (47), for example (S205).

In this way, using the difference between the first propagation time difference and the second propagation time difference, the propagation time difference may be obtained from the time for the ultrasonic waves to propagate from the downstream side to the upstream side and the time for the ultrasonic waves to propagate from the upstream side to the downstream side through the fluid propagation path traversing inside the pipe A in the radial direction for 2(n−m) number of times, which is an even number of times. As expressed with Expression (47), the components V cos ε parallel to the pipe A axis regarding the velocity V of the fluid is expressed using the known values prior to the measurement of the fluid velocity and the propagation time difference when traversing inside the pipe A in the radial direction for an even number of times, which is the propagation time difference $\Delta T_{2(n-m)}$, for example. Thus, the computation control unit 55 in the main unit may accurately calculate the components V cos ε parallel to the pipe A axis regarding the velocity V of the fluid on the basis of the first propagation time difference and the second propagation time difference even when the fluid flows at the angle ε in relation to the pipe A axis and contains components perpendicular to the pipe A axis regarding the velocity V of the fluid.

As the components parallel to the pipe A axis regarding the velocity V of the fluid are calculated on the basis of the first propagation time difference and the second propagation time difference, there is no need to arrange a long straight pipe in the upstream side to limit the effects of components perpendicular to the pipe A axis regarding the velocity V of the fluid.

Next, the arrangement of the first ultrasonic transceiver 20 and the second ultrasonic transceiver 30 in the ultrasonic flowmeter 100 will be described.

Figure 11:
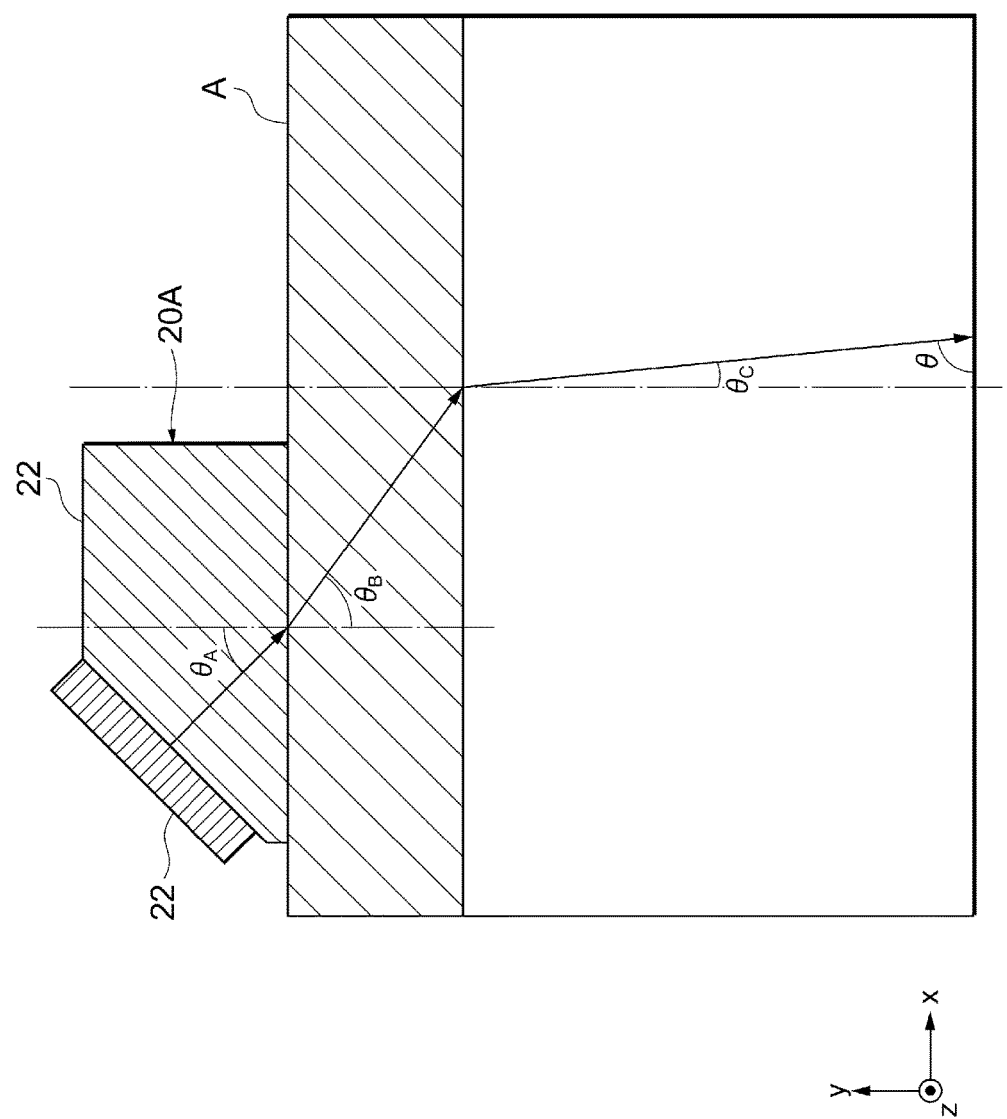
FIG. 11 is an expanded cross-sectional diagram describing an angle of ultrasonic waves transmitted by the first ultrasonic sensor illustrated in FIG. 1.

FIG. 11 is an expanded cross-sectional diagram describing an angle of ultrasonic waves transmitted by the first ultrasonic sensor 20A illustrated in FIG. 1. As illustrated in FIG. 11, the ultrasonic waves emitted from the ultrasonic transceiver 22 in the first ultrasonic sensor 20A irradiate to the outer circumference (outer wall) of the pipe A at the angle of incidence $\theta_A$. An angle of refraction $\theta_B$ is defined by Snell's law as previously described. If the angle of incidence $\theta_A$ is 45 degrees and the material of the pipe A is stainless steel (SUS), for example, then the angle of refraction $\theta_B$ is approximately 65 degrees. The ultrasonic waves propagating through the pipe A irradiate into the inner wall of the pipe A at an angle of incidence $(90°-\theta_B)$ based on the angle of refraction $\theta_B$. An angle of refraction $\theta_C$ is defined by Snell's law as previously described. If the fluid flowing in the pipe A is a liquid, specifically water, for the previously described example, then the angle of refraction $\theta_C$ is approximately 16 degrees. In this case, the aforementioned angle θ is approximately 74 degrees. If the fluid flowing in the pipe A is a gas, specifically air, regarding the previously described example, then the angle of refraction $\theta_C$ is approximately 5 degrees. In this case, the aforementioned angle θ is approximately 85 degrees.

In this way, the angle θ of ultrasonic waves propagating in the fluid is comparatively large, and the ultrasonic waves transmitted by the first ultrasonic sensor 20A are propagated at an angle θ that is nearly perpendicular to the fluid in the pipe A. Especially, when the fluid in the pipe A is a gas, the sound velocity C is slower than when the fluid is a liquid, which tends to increase the angle θ. When attempting to prevent the angle of incidence for the ultrasonic waves from becoming a critical angle at the boundary between the wedge 21 and the outer wall of the pipe A and the boundary between the inner wall of the pipe A and the inside of the pipe A, the selectable range for the angle of incidence $\theta_A$ narrows, which reduces flexibility in selection of the angle θ for ultrasonic waves. According to the previously described example, the pipe A is made from stainless steel (SUS), but the angle θ of ultrasonic waves would still be comparatively large if the pipe was made from plastic materials, for example.

In the example as illustrated in FIG. 11, the first ultrasonic sensor 20A transmits ultrasonic waves, but this is also applicable when the second ultrasonic sensor 30A transmits the ultrasonic waves. Thus, a detailed description of the how the second ultrasonic sensor 30A transmits ultrasonic waves is omitted, as it is virtually the same as how the previously described first ultrasonic sensor 20A transmits ultrasonic waves.

Figure 12:
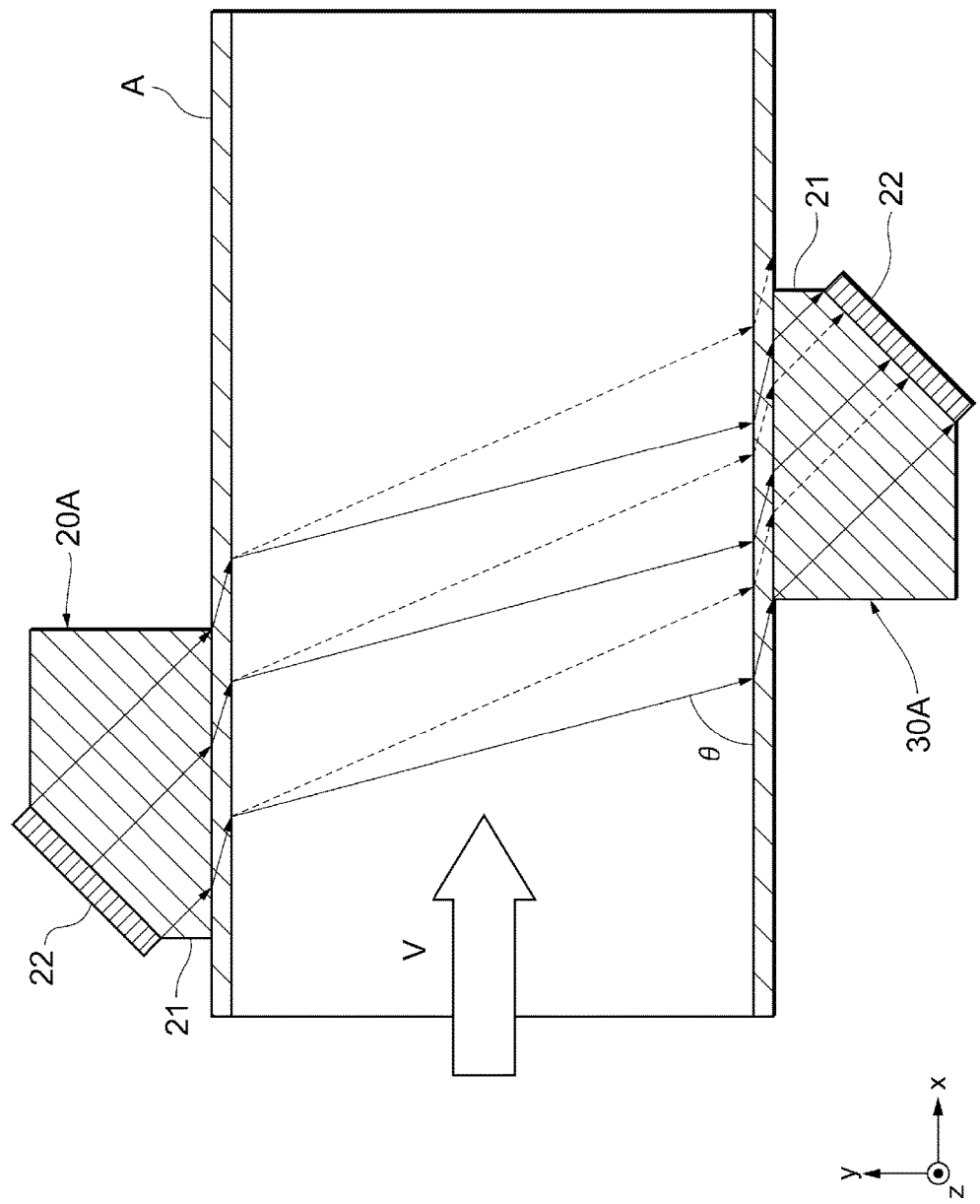
FIG. 12 is a side cross-sectional diagram describing the scenario in which the ultrasonic waves transmitted by the first ultrasonic sensor illustrated in FIG. 1 are received by the second ultrasonic sensor.
Figure 13:
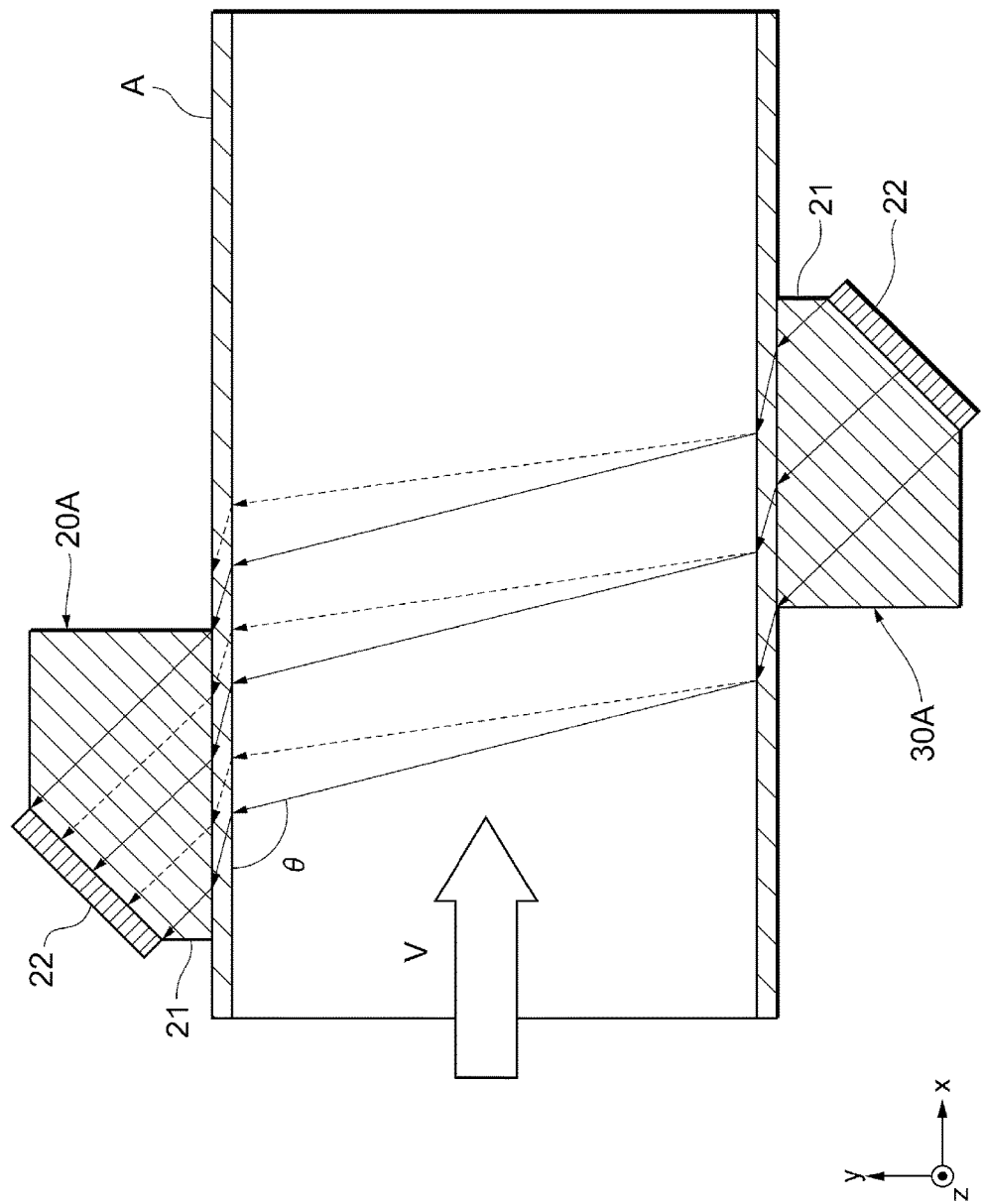
FIG. 13 is a side cross-sectional diagram describing the scenario in which the ultrasonic waves transmitted by the second ultrasonic sensor illustrated in FIG. 1 are received by the first ultrasonic sensor.

FIG. 12 is a side cross-sectional diagram describing the scenario in which the ultrasonic waves transmitted by the first ultrasonic sensor 20A illustrated in FIG. 1 are received by the second ultrasonic sensor 30A, and FIG. 13 is a side cross-sectional diagram describing the scenario in which the ultrasonic waves transmitted by the second ultrasonic sensor 30A illustrated in FIG. 1 are received by the first ultrasonic sensor 20A. As illustrated in FIG. 12, the ultrasonic waves transmitted by the first ultrasonic sensor 20A according to the dimensions of the ultrasonic transceiver 22 (horizontal and vertical lengths) propagate through the fluid inside the pipe A over the path illustrated by the solid lines inside the pipe A in FIG. 12 when the velocity V of the fluid is 0 [m/s]. The dimensions (horizontal and vertical lengths) of the ultrasonic transceiver 22 of the second ultrasonic sensor 30A are determined and the second ultrasonic sensor 30A is arranged so that all of these ultrasonic waves are received. Similarly, as illustrated in FIG. 13, the ultrasonic waves transmitted by the second ultrasonic sensor 30A according to the dimensions of the ultrasonic transceiver 22 (horizontal and vertical lengths) propagate through the fluid inside the pipe A over the path illustrated by the solid lines inside the pipe A in FIG. 13 when the velocity V of the fluid is 0 [m/s]. The dimensions (horizontal and vertical lengths) of the ultrasonic transceiver 22 of the first ultrasonic sensor 20A are determined and the first ultrasonic sensor 20A is arranged so that all of these ultrasonic waves are received.

Conversely, if the velocity V of the fluid is not 0 [m/s], the ultrasonic waves propagating through the fluid inside the pipe A are affected by the velocity V of the fluid and flow downstream (right sides of FIG. 12 and FIG. 13). In other words, the ultrasonic waves transmitted by the first ultrasonic sensor 20A and the second ultrasonic sensor 30A propagate through the fluid inside the pipe A over the path illustrated by the dashed lines inside the pipe A in FIG. 12 and FIG. 13. Thus, in consideration of these circumstances, the dimensions of the wedge 21 and particularly the length in the axial direction of pipe A for the first ultrasonic sensor 20A and the second ultrasonic sensor 30A are determined so that a predetermined ratio, 50% for example, of ultrasonic waves transmitted according to the dimensions of the ultrasonic transceiver 22 (horizontal and vertical lengths) are received if the maximum velocity V of the fluid measurable by the ultrasonic flowmeter 100 is 30 [m/s], for example.

In this way, the first ultrasonic sensor 20A and the second ultrasonic sensor 30A of the ultrasonic flowmeter 100 may be fitted to the outer circumference of the pipe A even if the diameter (size) of the pipe A is, for example, 50 A or 150 A by determining the arrangement and dimensions of the first ultrasonic sensor 20A and the second ultrasonic sensor 30A.

For the sake of simplicity of description, in the examples illustrated in FIG. 12 and FIG. 13, the fluid flows at the velocity V in a direction parallel to the pipe A axis, and the ultrasonic waves travels a path that traverses (crosses) inside the pipe A in the radial direction one time. However, as previously described, the ultrasonic waves transmitted by the first ultrasonic sensor 20A and the second ultrasonic sensor 30A propagate through the first fluid propagation path that traverses inside the pipe A in the radial direction for a 2n−1 number of times and propagate through the second fluid propagation path that traverses inside the pipe A in the radial direction for a 2m−1 number of times. Thus, the actual arrangement of the first ultrasonic sensor 20A and the second ultrasonic sensor 30A as well as the dimensions of the ultrasonic transceiver 22 and the wedge 21 are determined with consideration for the first fluid propagation path and the second fluid propagation path. When the fluid flows at the angle ϵ in relation to the pipe A axis, the arrangement of the first ultrasonic sensor 20A and the second ultrasonic sensor 30A as well as the dimensions of the ultrasonic transceiver 22 and the wedge 21 are also determined on the basis of the components V cos ϵ that are parallel to the pipe A axis regarding the velocity V of the fluid.

Figure 14:
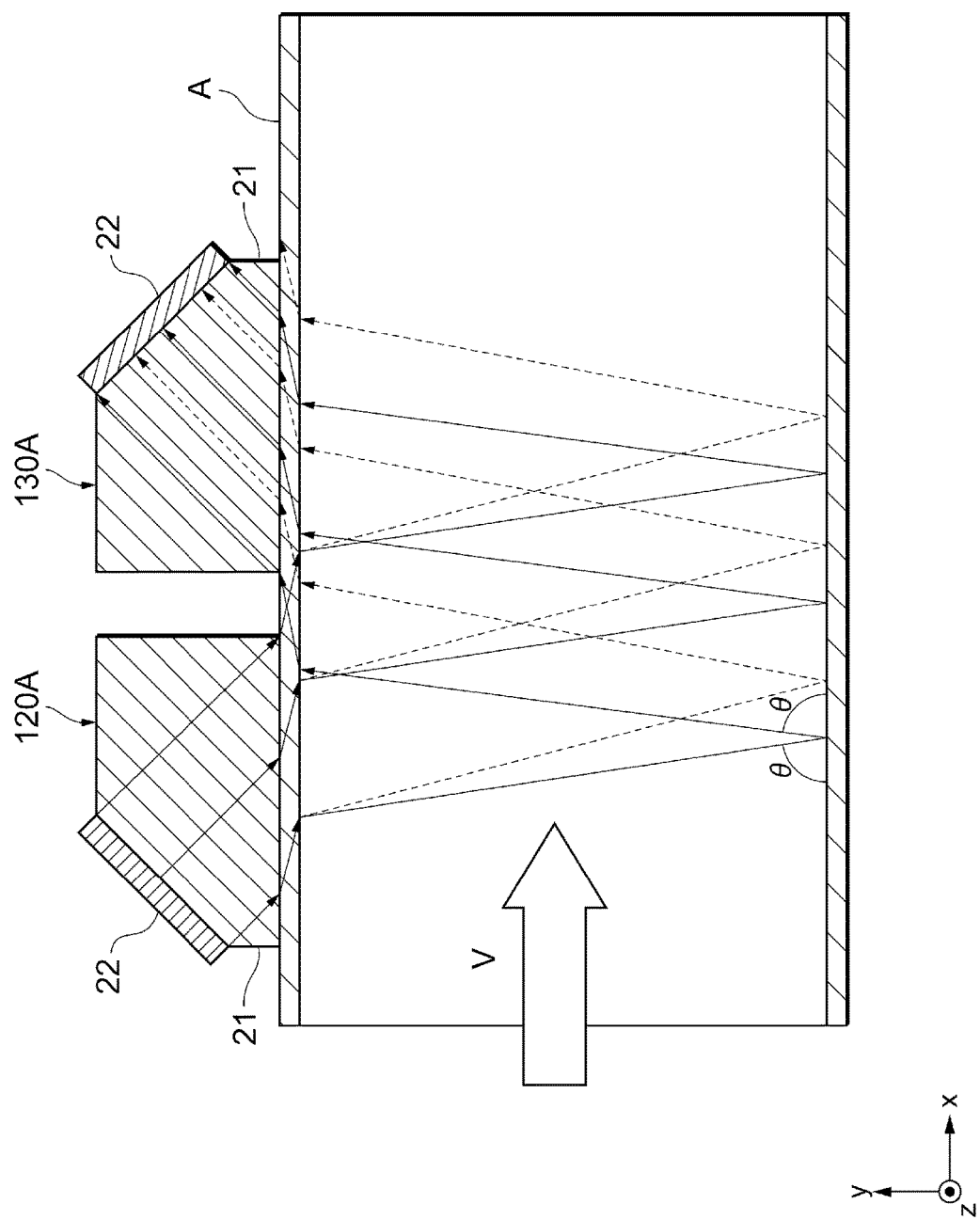
FIG. 14 is a side cross-sectional diagram describing an arrangement of the first ultrasonic sensor and the second ultrasonic sensor in a virtual ultrasonic flowmeter.
Figure 15:
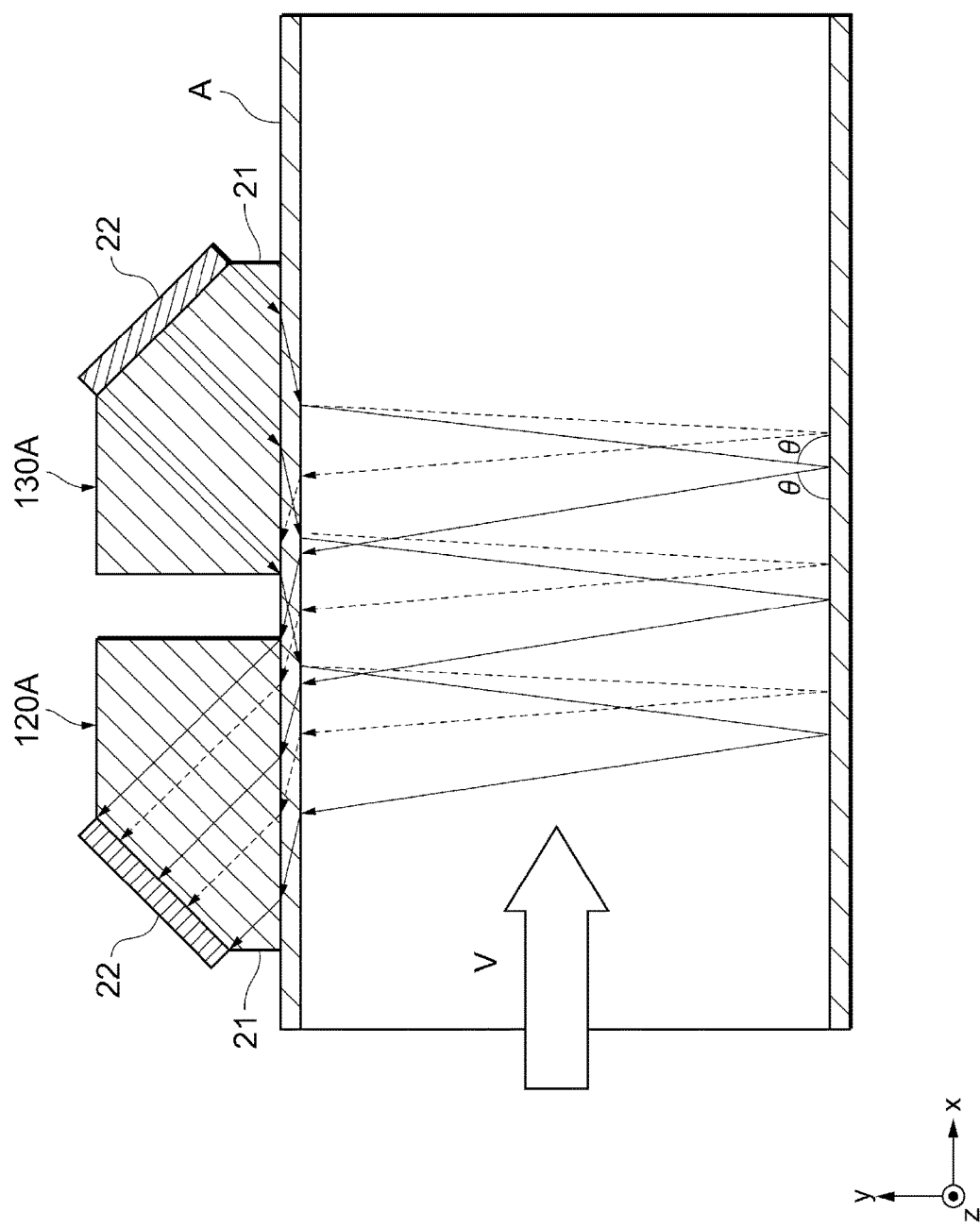
FIG. 15 is a side cross-sectional diagram describing an arrangement of the first ultrasonic sensor and the second ultrasonic sensor in a virtual ultrasonic flowmeter.

FIG. 14 and FIG. 15 are side cross-sectional diagrams describing an arrangement of a first ultrasonic sensor 120A and a second ultrasonic sensor 130A in a virtual ultrasonic flowmeter. The virtual ultrasonic flowmeter is equipped with the first ultrasonic sensor 120A and the second ultrasonic sensor 130A that have the same configuration as the first ultrasonic sensor 20A and the second ultrasonic sensor 30A in the ultrasonic flowmeter 100, and is the same as the ultrasonic flowmeter 100 except for the arrangement of the first ultrasonic sensor 120A and the second ultrasonic sensor 130A. As illustrated in FIG. 14 and FIG. 15, the first ultrasonic sensor 120A and the second ultrasonic sensor 130A in the virtual ultrasonic flowmeter are arranged on the same straight line on one side of the pipe A (top of FIG. 14 and FIG. 15).

As previously described, as the angle θ of ultrasonic waves propagating in the fluid is comparatively large, the distance that ultrasonic waves travel along the x axis is significantly short when the velocity V of the fluid is 0 [m/s]. Thus, as with the examples in FIG. 12 and FIG. 13, the first ultrasonic sensor 120A and the second ultrasonic sensor 130A in the virtual ultrasonic flowmeter must be arranged closely to receive all ultrasonic waves transmitted according to the dimensions (horizontal and vertical lengths) of the ultrasonic transceiver 22 when the velocity V of the fluid is 0 [m/s].

Here, the ultrasonic waves transmitted by the first ultrasonic sensor 120A and the second ultrasonic sensor 130A are divided into fluid propagation waves that propagate through the fluid in the pipe A and pipe propagation waves that reflect off the wall of the pipe A and propagate through the pipe A. The fluid propagation waves are detectable signals (signal components) while the pipe propagation waves are signal noise (noise components). As illustrated in FIG. 14 and FIG. 15, if the first ultrasonic sensor 120A and the second ultrasonic sensor 130A are arranged closely, the pipe propagation waves, which are noise components, are more readily received, which makes it difficult to identify fluid propagation waves and pipe propagation waves.

The first ultrasonic sensor 120A and the second ultrasonic sensor 130A in the virtual flowmeter interfere with each other preventing (blocking) fitment if the dimensions of the wedge 21 (length in the axial direction of pipe A) are determined so that, as with the examples in FIG. 12 and FIG. 13, 50% of the ultrasonic waves transmitted according to the dimensions (horizontal and vertical lengths) are received when the maximum velocity V of the measurable fluid is 30 [m/s], for example.

For this reason, according to the virtual flowmeter illustrated in FIG. 14 and FIG. 15, the maximum velocity V of the measurable fluid must be restricted to less than 20 [m/s], for example, and the dimensions (length in the direction of the pipe axis) of the wedge 21 must be reduced.

Conversely, as illustrated in FIG. 12 and FIG. 13, the first ultrasonic sensor 20A of the first ultrasonic transceiver 20 and the second ultrasonic sensor 30A of the second ultrasonic transceiver 30 in the ultrasonic flowmeter 100 are arranged to sandwich the fluid flowing inside the pipe A. As a result, the first ultrasonic sensor 20A of the first ultrasonic transceiver 20 and the second ultrasonic sensor 30A of the second ultrasonic transceiver 30 do not interfere with each other preventing (blocking) fitment even if their dimensions (length in the direction of the pipe axis) are increased.

By arranging the first ultrasonic sensor 20A of the first ultrasonic transceiver 20 and the second ultrasonic sensor 30A of the second ultrasonic transceiver 30 to sandwich the fluid flowing in the pipe A, pipe propagation waves are less likely to be received in comparison with a scenario in which the first ultrasonic sensor 120A and second ultrasonic sensor 130A are arranged on the same straight line of pipe A as with the virtual flowmeter illustrated in FIG. 14 and FIG. 15.

According to the present embodiment, the first propagation path is longer than the second propagation path (n>m), but the present invention is not limited thusly. The second propagation path may be longer than the first propagation path (m>n), but the first propagation path and the second propagation path must not be of equal length (n=m). Thus, the computation control unit 55 calculates the difference between the second propagation time difference and the first propagation time difference in step S204 and calculates the components V cos ϵ parallel to the pipe A axis regarding the velocity V of the fluid using this difference and Expression (47) in step S205.

According to the ultrasonic flowmeter 100 regarding the present embodiment, the first ultrasonic transceiver 20 and the second ultrasonic transceiver 30 are arranged to sandwich the fluid flowing in the pipe A, and the main unit 50 calculates the components of the fluid velocity that are parallel to the pipe A axis on the basis of the first propagation time difference, which is the difference in time between the time that ultrasonic waves transmitted from the second ultrasonic transceiver 30 and the time that ultrasonic waves transmitted from the first ultrasonic transceiver 20 propagate through the first fluid propagation path traversing inside the pipe in the radial direction for a 2n−1 number of times (n is a positive integer), and the second propagation time difference, which is the difference in time between the time that ultrasonic waves transmitted from the second ultrasonic transceiver 30 and the time that ultrasonic waves transmitted from the first ultrasonic transceiver 20 propagate through the second fluid propagation path traversing inside the pipe in the radial direction for a 2m−1 number of times (m is a positive integer other than n). Here, using the difference between the first propagation time difference and the second propagation time difference, the propagation time difference may be obtained from the time for the ultrasonic waves to propagate from the downstream side to the upstream side and the time for the ultrasonic waves to propagate from the upstream side to the downstream side through the fluid propagation path traversing in the pipe A in the radial direction for a 2(n−m) number of times, which is an even number of times. As expressed with Expression (47), the components V cos ϵ parallel to the pipe A axis regarding the velocity V of the fluid is expressed using the known values prior to the measurement of the fluid velocity and the propagation time difference when traversing inside the pipe A in the radial direction for an even number of times, which is the propagation time difference $\Delta T_{2(n-m)}$, for example. Thus, the computation control unit 55 in the main unit may accurately calculate the components V cos ϵ parallel to the pipe A axis regarding the velocity V of the fluid on the basis of the first propagation time difference and the second propagation time difference even when the fluid flows at the angle ϵ in relation to the pipe A axis and contains components perpendicular to the pipe A axis regarding the velocity V of the fluid. Therefore, the ultrasonic flowmeter 100 may accurately measure the fluid flow rate Q on the basis of the components V cos ϵ parallel to the pipe A axis regarding the velocity V of the fluid.

As the components parallel to the pipe axis regarding the velocity V of the fluid are calculated on the basis of the first propagation time difference and the second propagation time difference, there is no need to arrange a long straight pipe in the upstream side to limit the effects of components perpendicular to the pipe axis regarding the velocity V of the fluid. Therefore, the ultrasonic flowmeter 100 may ease constraints (restrictions) on placement locations and may be placed at any desired location such as immediately after curved pipe, for example.

The first ultrasonic sensor 20A of the first ultrasonic transceiver 20 and the second ultrasonic sensor 30A of the second ultrasonic transceiver 30 are also arranged to sandwich the fluid flowing inside the pipe A. As a result, the first ultrasonic sensor 20A of the first ultrasonic transceiver 20 and the second ultrasonic sensor 30A of the second ultrasonic transceiver 30 do not interfere with each other preventing (blocking) fitment even if their dimensions (length in the axial direction of the pipe A) are increased. Therefore, the measurable range of fluid velocity of the ultrasonic flowmeter may be readily increased by increasing the dimensions (length in the axial direction of the pipe A) of the first ultrasonic transceiver 20 and the second ultrasonic transceiver 30.

By arranging the first ultrasonic sensor 20A of the first ultrasonic transceiver 20 and the second ultrasonic sensor 30A of the second ultrasonic transceiver 30 to sandwich the fluid flowing in the pipe A, pipe propagation waves are less likely to be received in comparison with a scenario in which the first ultrasonic sensor 120A and second ultrasonic sensor 130A are arranged on the same straight line of pipe A as with the virtual flowmeter illustrated in FIG. 14 and FIG. 15. Therefore, the ultrasonic flowmeter 100 may improve the SN ratio.

According to the ultrasonic flowmeter 100 regarding the present embodiment, the first ultrasonic transceiver 20 is equipped with a first ultrasonic sensor 20A fitted to the outer circumference of the pipe A, and the second ultrasonic transceiver 30 is equipped with a second ultrasonic sensor 30A fitted to the outer circumference of the pipe A. As a result, the first ultrasonic transceiver 20 and the second ultrasonic transceiver 30 that transmits and receives ultrasonic waves may be readily fitted to the pipe A without any piping construction or modification.

According to the ultrasonic flowmeter 100 regarding the present embodiment, the first fluid propagation path traverses inside the pipe A in the radial direction three times, and the second fluid propagation path traverses inside the pipe A in the radial direction one time. As a result, the propagation time difference $\Delta T_2$ for the path traversing inside the pipe A two times may be readily obtained on the basis of the first propagation time difference $\Delta t_3$ and the second propagation time difference $\Delta t_1$, and the main unit 50 that calculates the components V cos ϵ parallel to the pipe A axis regarding the velocity V of the fluid may be readily achieved (configured).

According to the ultrasonic flowmeter 100 regarding the present embodiment, the first fluid propagation path traverses inside the pipe A in the radial direction five times and the second fluid propagation path traverses inside the pipe A in the radial direction three times. As a result, the propagation time difference $\Delta T_2$ for the path traversing inside the pipe A two times may be readily obtained on the basis of the first propagation time difference $\Delta t_5$ and the second propagation time difference $\Delta t_3$ and the main unit 50 that calculates the components V cos ϵ parallel to the pipe A axis regarding the velocity V of the fluid may be readily achieved (configured).

According to the ultrasonic flowmeter 100 regarding the present embodiment, the first fluid propagation path traverses inside the pipe A in the radial direction seven times and the second fluid propagation path traverses inside the pipe A in the radial direction five times. As a result, the propagation time difference $\Delta T_2$ for the path traversing inside the pipe A two times may be readily obtained on the basis of the first propagation time difference $\Delta t_7$ and the second propagation time difference $\Delta t_5$ and the main unit 50 that calculates the components V cos ϵ parallel to the pipe A axis regarding the velocity V of the fluid may be readily achieved (configured).

According to flow velocity measurement method used by the ultrasonic flowmeter 100 regarding the present embodiment, a step is included to calculate the components of the fluid velocity that are parallel to the pipe A axis on the basis of the first propagation time difference, which is the difference in time between the time that ultrasonic waves transmitted from the second ultrasonic transceiver 30 and the time that ultrasonic waves transmitted from the first ultrasonic transceiver 20 propagate through the first fluid propagation path traversing inside the pipe in the radial direction for a 2n−1 number of times (n is a positive integer), and the second propagation time difference, which is the difference in time between the time that ultrasonic waves transmitted from the second ultrasonic transceiver 30 and the time that ultrasonic waves transmitted from the first ultrasonic transceiver 20 propagate through the second fluid propagation path traversing inside the pipe in the radial direction for a 2m−1 number of times (m is a positive integer other than n). Here, using the difference between the first propagation time difference and the second propagation time difference, the propagation time difference may be obtained from the time for the ultrasonic waves to propagate from the downstream side to the upstream side and the time for the ultrasonic waves to propagate from the upstream side to the downstream side through the fluid propagation path traversing in the pipe A in the radial direction for a 2(n−m) number of times, which is an even number of times. As expressed with Expression (47), the components V cos ϵ parallel to the pipe A axis regarding the velocity V of the fluid is expressed using the known values prior to the measurement of the fluid velocity and the propagation time difference when traversing inside the pipe A in the radial direction for an even number of times, which is the propagation time difference $\Delta T_{2(n-m)}$, for example. Thus, the computation control unit 55 in the main unit may accurately calculate the components V cos ϵ parallel to the pipe A axis regarding the velocity V of the fluid on the basis of the first propagation time difference and the second propagation time difference even when the fluid flows at the angle ϵ in relation to the pipe A axis and contains components perpendicular to the pipe A axis regarding the velocity V of the fluid. Therefore, the ultrasonic flowmeter 100 may accurately measure the fluid flow rate Q on the basis of the components V cos ϵ parallel to the pipe A axis regarding the velocity V of the fluid.

As the components parallel to the pipe axis regarding the velocity V of the fluid are calculated on the basis of the first propagation time difference and the second propagation time difference, there is no need to arrange a long straight pipe in the upstream side to limit the effects of components perpendicular to the pipe axis regarding the velocity V of the fluid. Therefore, the ultrasonic flowmeter 100 may ease constraints (restrictions) on placement locations and may be placed at any desired location such as immediately after curved pipe, for example.

The first ultrasonic sensor 20A of the first ultrasonic transceiver 20 and the second ultrasonic sensor 30A of the second ultrasonic transceiver 30 are also arranged to sandwich the fluid flowing inside the pipe A. As a result, the first ultrasonic sensor 20A of the first ultrasonic transceiver 20 and the second ultrasonic sensor 30A of the second ultrasonic transceiver 30 do not interfere with each other preventing (blocking) fitment even if their dimensions (length in the axial direction of the pipe) are increased. Therefore, the measurable range of fluid velocity of the ultrasonic flowmeter may be readily increased by increasing the dimensions (length in the axial direction of the pipe) of the first ultrasonic transceiver 20 and the second ultrasonic transceiver 30.

By arranging the first ultrasonic sensor 20A of the first ultrasonic transceiver 20 and the second ultrasonic sensor 30A of the second ultrasonic transceiver 30 to sandwich the fluid flowing in the pipe A, pipe propagation waves are less likely to be received in comparison with a scenario in which the first ultrasonic sensor 120A and second ultrasonic sensor 130A are arranged on the same straight line of pipe A as with the virtual flowmeter illustrated in FIG. 14 and FIG. 15. Therefore, the ultrasonic flowmeter 100 may improve the SN ratio.

According to the program executed by the ultrasonic flowmeter 100 regarding the present embodiment, the fluid velocity measuring process S200 calculates the components of the fluid velocity that are parallel to the pipe A axis on the basis of the first propagation time difference, which is the difference in time between the time that ultrasonic waves transmitted from the second ultrasonic transceiver 30 and the time that ultrasonic waves transmitted from the first ultrasonic transceiver 20 propagate through the first fluid propagation path traversing inside the pipe in the radial direction for a 2n−1 number of times (n is a positive integer), and the second propagation time difference, which is the difference in time between the time that ultrasonic waves transmitted from the second ultrasonic transceiver 30 and the time that ultrasonic waves transmitted from the first ultrasonic transceiver 20 propagate through the second fluid propagation path traversing inside the pipe in the radial direction for a 2m−1 number of times (m is a positive integer other than n). Here, using the difference between the first propagation time difference and the second propagation time difference, the propagation time difference may be obtained from the time for the ultrasonic waves to propagate from the downstream side to the upstream side and the time for the ultrasonic waves to propagate from the upstream side to the downstream side through the fluid propagation path traversing in the pipe A in the radial direction for a 2(n−m) number of times, which is an even number of times. As expressed with Expression (47), the components V cos ϵ parallel to the pipe A axis regarding the velocity V of the fluid is expressed using the known values prior to the measurement of the fluid velocity and the propagation time difference when traversing inside the pipe A in the radial direction for an even number of times, which is the propagation time difference $\Delta T_{2(n-m)}$, for example. Thus, the fluid velocity measuring process S200 may accurately calculate the components V cos ϵ parallel to the pipe A axis regarding the velocity V of the fluid on the basis of the first propagation time difference and the second propagation time difference even when the fluid flows at the angle ϵ in relation to the pipe A axis and contains components perpendicular to the pipe A axis regarding the velocity V of the fluid. Therefore, the ultrasonic flowmeter 100 may accurately measure the fluid flow rate Q on the basis of the components V cos ϵ parallel to the pipe A axis regarding the velocity V of the fluid.

As the components parallel to the pipe A axis regarding the velocity V of the fluid are calculated on the basis of the first propagation time difference and the second propagation time difference, there is no need to arrange a long straight pipe in the upstream side to limit the effects of components perpendicular to the pipe A axis regarding the velocity V of the fluid. Therefore, the ultrasonic flowmeter 100 may ease constraints (restrictions) on placement locations and may be placed at any desired location such as immediately after curved pipe, for example.

The first ultrasonic sensor 20A of the first ultrasonic transceiver 20 and the second ultrasonic sensor 30A of the second ultrasonic transceiver 30 are also arranged to sandwich the fluid flowing inside the pipe A. As a result, the first ultrasonic sensor 20A of the first ultrasonic transceiver 20 and the second ultrasonic sensor 30A of the second ultrasonic transceiver 30 do not interfere with each other preventing (blocking) fitment even if their dimensions (length in the axial direction of the pipe) are increased. Therefore, the measurable range of fluid velocity of the ultrasonic flowmeter may be readily increased by increasing the dimensions (length in the axial direction of the pipe) of the first ultrasonic transceiver 20 and the second ultrasonic transceiver 30.

By arranging the first ultrasonic sensor 20A of the first ultrasonic transceiver 20 and the second ultrasonic sensor 30A of the second ultrasonic transceiver 30 to sandwich the fluid flowing in the pipe A, pipe propagation waves are less likely to be received in comparison with a scenario in which the first ultrasonic sensor 120A and second ultrasonic sensor 130A are arranged on the same straight line of pipe A as with the virtual flowmeter illustrated in FIG. 14 and FIG. 15. Therefore, the ultrasonic flowmeter 100 may improve the SN ratio.

Second Embodiment

Figure 16:
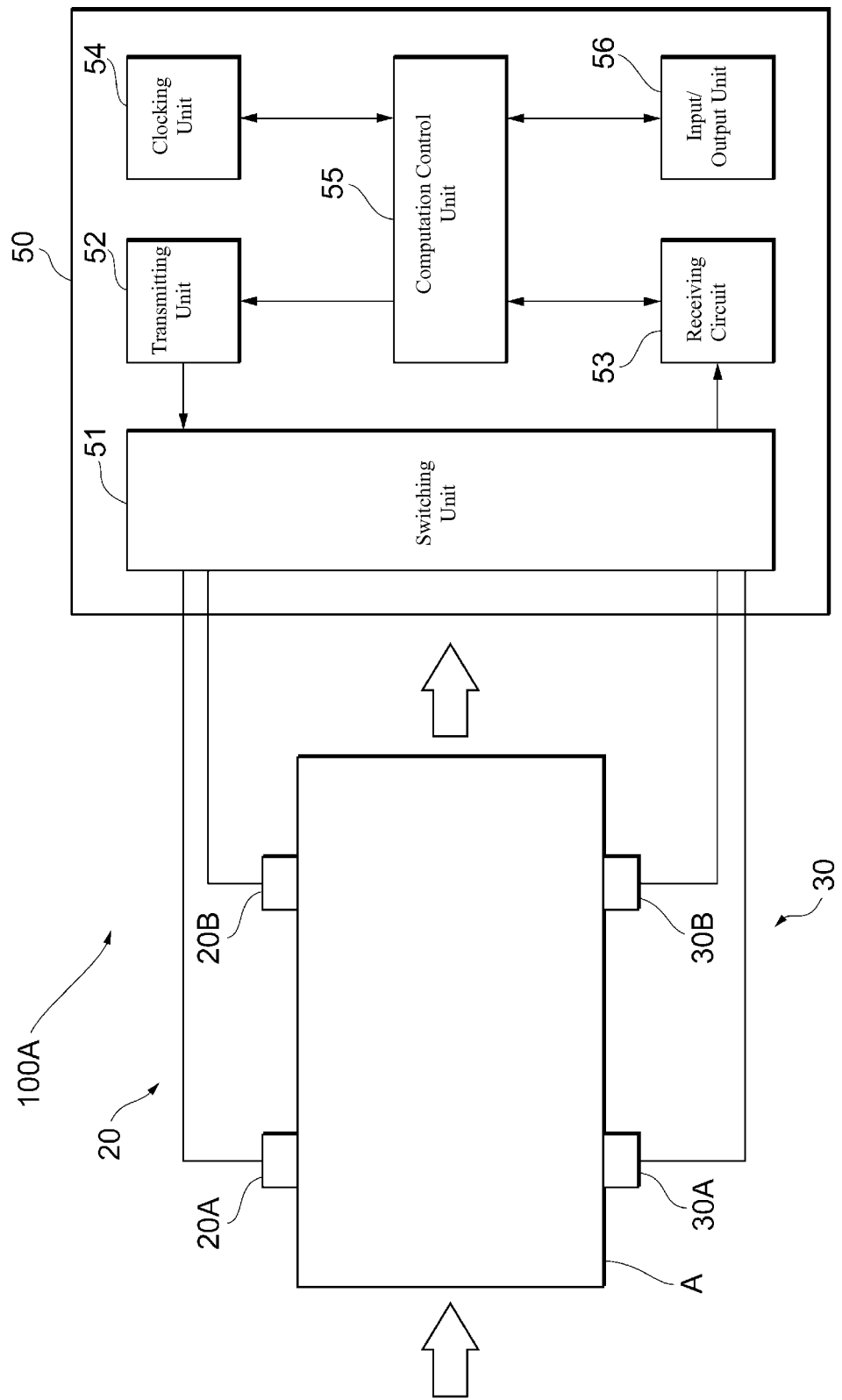
FIG. 16 is a configuration diagram illustrating an overall configuration of an ultrasonic flowmeter according to a second Embodiment.
Figure 17:
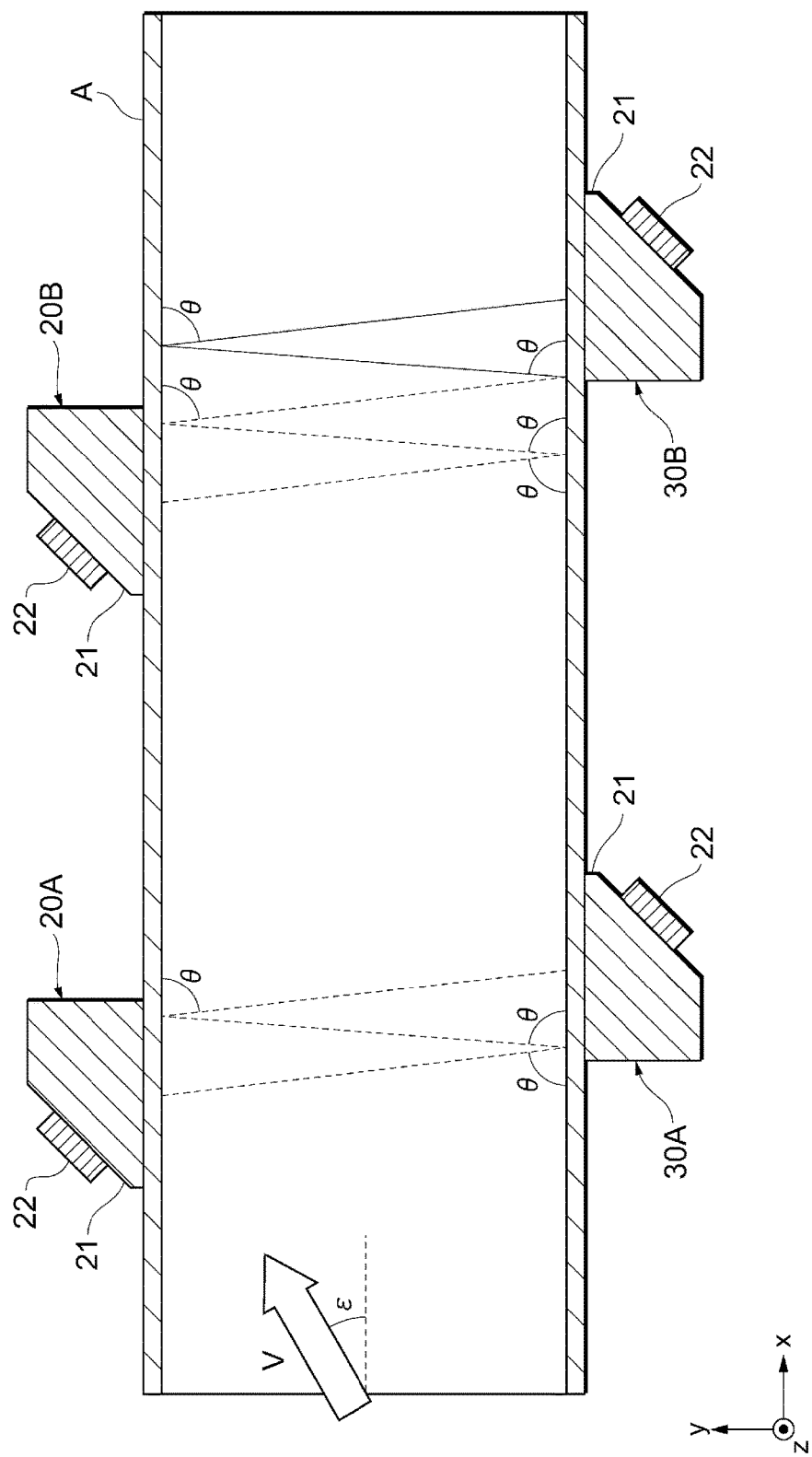
FIG. 17 is a side cross-sectional diagram describing an example of calculating the first propagation time difference and the second propagation time difference according to the second Embodiment.

FIG. 16 through FIG. 17 illustrates a second Embodiment of an ultrasonic flowmeter, flow velocity measurement method and flow velocity measurement program according to the present invention. Unless otherwise stated, the same reference numerals are used to represent the configuration elements that are the same with the previously described first Embodiment, and the description of these configuration elements is omitted. Similar reference numerals are used to represent the configuration elements that are similar with the previously described first Embodiment, and a detailed description of these configuration elements is omitted. Configurations, operations, and arrangements not illustrated are the same as those for the previously described the first Embodiment.

FIG. 16 is a configuration diagram illustrating an overall configuration of an ultrasonic flowmeter 100A according to the second Embodiment. As illustrated in FIG. 16 and similar to the ultrasonic flowmeter 100, the ultrasonic flowmeter 100A is equipped with a first ultrasonic transceiver 20, a second ultrasonic transceiver 30, and a main unit 50.

The first ultrasonic transceiver 20 is equipped with both the first ultrasonic sensor 20A and a first ultrasonic sensor 20B fitted to the outer circumference of the pipe A. The second ultrasonic transceiver 30 is equipped with both the second ultrasonic sensor 30A and a second ultrasonic sensor 30B fitted to the outer circumference of the pipe A. As a result, the first ultrasonic transceiver 20 and the second ultrasonic transceiver 30 that transmits and receives ultrasonic waves may be readily fitted to the pipe A without any piping construction or modification.

The first ultrasonic sensor 20A of the first ultrasonic transceiver 20 is fitted to the pipe A at a predetermined position, and the second ultrasonic sensor 30A of the second ultrasonic transceiver 30 is fitted to the pipe A downstream (right side of FIG. 16) from the first ultrasonic sensor 20A of the first ultrasonic transceiver 20. In other words, the first ultrasonic sensor 20A of the first ultrasonic transceiver 20 is fitted to the pipe A upstream (left side of FIG. 16) from the second ultrasonic sensor 30A of the second ultrasonic transceiver 30.

The first ultrasonic sensor 20B of the first ultrasonic transceiver 20 is fitted to the pipe A at a predetermined position, and the second ultrasonic sensor 30B of the second ultrasonic transceiver 30 is fitted to the pipe A downstream (right side of FIG. 16) from the first ultrasonic sensor 20B of the first ultrasonic transceiver 20. In other words, the first ultrasonic sensor 20B of the first ultrasonic transceiver 20 is fitted to the pipe A upstream (left side of FIG. 16) from the second ultrasonic sensor 30B of the second ultrasonic transceiver 30.

The first ultrasonic sensor 20A of the first ultrasonic transceiver 20 and the second ultrasonic sensor 30A of the second ultrasonic transceiver 30 are also arranged facing each other to sandwich the fluid flowing inside the pipe A. Similarly, the first ultrasonic sensor 20B of the first ultrasonic transceiver 20 and the second ultrasonic sensor 30B of the second ultrasonic transceiver 30 are also arranged facing each other to sandwich the fluid flowing inside the pipe A.

The switching unit 51 of the main unit 50 is connected to the first ultrasonic sensor 20A, the first ultrasonic sensor 20B, the second ultrasonic sensor 30A, and the second ultrasonic sensor 30B. The switching unit 51 switches the switch on the basis of a control signal input from the computation control unit 55, connects either the first ultrasonic sensor 20A or the first ultrasonic sensor 20B or the second ultrasonic sensor 30A or the second ultrasonic sensor 30B to the transmitting circuit 52 while also connecting the other of these that can receive the transmitted ultrasonic waves to the receiving circuit 53. Specifically, if the first ultrasonic sensor 20A is connected to the transmitting circuit 52, for example, then the second ultrasonic sensor 30A, which can receive ultrasonic waves transmitted by the first ultrasonic sensor 20A, is connected to the receiving circuit 53.

FIG. 17 is a side cross-sectional diagram describing an example of calculating the first propagation time difference and the second propagation time difference according to the second Embodiment. Similar to the first Embodiment and as illustrated in FIG. 17, the direction parallel to the pipe A axis is referred to as the x axis (or direction in the x axis), the direction perpendicular to the x axis and parallel to the diameter of pipe A is referred to as the y axis (or direction in the y axis), and the direction perpendicular to the x axis and the y axis is referred to as the z axis (or direction in the z axis). As illustrated in FIG. 17, the fluid velocity is represented as V [m/s], the velocity by which the ultrasonic waves propagate through the fluid (hereinafter, referred to as sound velocity) is referred to as C [m/s], the length of the propagation path of the ultrasonic waves propagating through the fluid is referred to as L [m], and the angle formed from the propagation path of the ultrasonic waves and the inner wall of the pipe A is referred to as θ. According to the example illustrated in FIG. 17, the first fluid propagation path traverses (crosses) inside the pipe in the radial direction five times, and the second fluid propagation path traverses (crosses) inside the pipe in the radial direction three times. In this case and similar to that illustrated in FIG. 9, the path difference between the first fluid propagation path and the second fluid propagation path traverses (crosses) inside the pipe A in the radial direction two times, as illustrated by the solid lines inside the pipe A in FIG. 17.

Conversely, according to FIG. 17 and different to that illustrated in FIG. 9, the first propagation time difference for the first fluid propagation path is measured using the first ultrasonic sensor 20A and the second ultrasonic sensor 30A, and the second propagation time difference for the second fluid propagation path is measured using the first ultrasonic sensor 20B and the second ultrasonic sensor 30B.

Even in the scenario illustrated in FIG. 17, the computation control unit 55 may calculate, as step S205, the components V cos ε parallel to the pipe A axis regarding the velocity V of the fluid using the difference calculated in step S204 as illustrated in FIG. 5, which, for example, is represented by the propagation time difference $\Delta T_{2(n-m)}$, and Expression (47).

As illustrated in FIG. 17 and according to the present embodiment, the first fluid propagation path traverses (crosses) inside the pipe A in the radial direction five times, and the second fluid propagation path traverses (crosses) inside the pipe A in the radial direction three times, but the present invention is not limited thusly. Similar to the first Embodiment, the first fluid propagation path may be any path that traverses (cross) the inside of the pipe A in the radial direction for a 2n−1 (n is a positive integer) number of times, and the second fluid propagation path may be any path that traverses (crosses) the inside of the pipe A in the radial direction for a 2m−1 (m is a positive integer other than n) number of times.

According to the ultrasonic flowmeter 100A regarding the present embodiment, the first ultrasonic transceiver 20 is equipped with both the first ultrasonic sensor 20A and the first ultrasonic sensor 20B fitted to the outer circumference of the pipe A, and the second ultrasonic transceiver 30 is equipped with both the second ultrasonic sensor 30A and the second ultrasonic sensor 30B fitted to the outer circumference of the pipe A. As a result, the same effect as that of the ultrasonic flowmeter 100 according to the first Embodiment is achieved while the first ultrasonic transceiver 20 and the second ultrasonic transceiver 30 that transmits and receives ultrasonic waves may be readily fitted to the pipe A without any piping construction or modification.

As the first ultrasonic transceiver 20 is equipped with both the first ultrasonic sensor 20A and the first ultrasonic sensor 20B and the second ultrasonic transceiver 30 is equipped with both the second ultrasonic sensor 30A and the second ultrasonic sensor 30B, the first propagation time difference may be measured using the first ultrasonic sensor 20A and the second ultrasonic sensor 30A and the second propagation time difference may be measured using the first ultrasonic sensor 20B and the second ultrasonic sensor 30B, for example.

According to the flow velocity measurement method used by the ultrasonic flowmeter 100A according to the present embodiment, the same effect as that with the flow velocity measurement method used by the ultrasonic flowmeter 100 according to the first Embodiment may be achieved.

According to the flow velocity measurement program executed by the ultrasonic flowmeter 100A according to the present embodiment, the same effect as that with the flow velocity measurement program executed by the ultrasonic flowmeter 100 according to the first Embodiment may be achieved.

The configuration of the previously described embodiments may be combined or certain configuration elements may be removed. The configuration of the present invention is not limited by the previously described embodiments and may be changed or modified as long as they are within the scope of the present invention.

REFERENCE NUMERALS

20 . . . First ultrasonic transceiver
20A, 20B . . . First ultrasonic sensor
21 . . . Wedge
21a . . . Bottom surface
21b . . . Slope
22 . . . Piezoelectric element
30 . . . Second ultrasonic transceiver
30A, 30B . . . Second ultrasonic sensor
50 . . . Main unit
51 . . . Switching unit
52 . . . Transmitting circuit
53 . . . Receiving circuit
54 . . . Clocking unit
55 . . . Computation control unit
56 . . . Input/output unit
100, 100A . . . Ultrasonic flowmeter
A . . . Pipe

The invention claimed is:

1. An ultrasonic flowmeter comprising:
a first ultrasonic transceiver configured to transmit and receive ultrasonic waves and is fitted to a pipe through which a fluid flows inside;
a second ultrasonic transceiver configured to transmit and receive ultrasonic waves and is fitted to the pipe downstream from the first ultrasonic transceiver; and
a main unit configured to measure the velocity of the fluid; wherein
the first ultrasonic transceiver and the second ultrasonic transceiver are arranged to sandwich the fluid, and the main unit calculates components parallel to the pipe regarding the velocity of the fluid on the basis of the a propagation time difference, which is the difference in time between the time that ultrasonic waves transmitted from the second ultrasonic transceiver and the time that ultrasonic waves transmitted from the first ultrasonic transceiver propagate through a first fluid propagation path traversing inside the pipe in the radial direction for a 2n−1 number of times (n is a positive integer), and a second propagation time difference, which is the difference in time between the time that ultrasonic waves transmitted from the second ultrasonic transceiver and the time that ultrasonic waves transmitted from the first ultrasonic transceiver propagate through a second fluid propagation path traversing inside the pipe in the radial direction for a 2m−1 number of times (m is a positive integer other than n).

2. The ultrasonic sensor according to claim 1, wherein the first ultrasonic transceiver and the second ultrasonic transceiver are each equipped with an ultrasonic sensor fitted to the outer circumference of the pipe.

3. The ultrasonic sensor according to claim 1, wherein the first ultrasonic transceiver and the second ultrasonic transceiver are each equipped with two ultrasonic sensors fitted to the outer circumference of the pipe.

4. The ultrasonic flowmeter according to claim 1, wherein the first fluid propagation path traverses inside the pipe in the radial direction three times, and the second fluid propagation path traverses inside the pipe in the radial direction one time.

5. The ultrasonic flowmeter according to claim 1, wherein the first fluid propagation path traverses inside the pipe in the radial direction five times, and the second fluid propagation path traverses inside the pipe in the radial direction three times.

6. The ultrasonic flowmeter according to claim 1, wherein the first fluid propagation path traverses inside the pipe in the radial direction seven times, and the second fluid propagation path traverses inside the pipe in the radial direction five times.

7. A flow velocity measurement method for an ultrasonic flowmeter, the ultrasonic flowmeter comprising:
a first ultrasonic transceiver configured to transmit and receive ultrasonic waves and is fitted to a pipe through which a fluid flows inside;
a second ultrasonic transceiver configured to transmit and receive ultrasonic waves and is fitted to the pipe downstream from the first ultrasonic transceiver;
a main unit configured to measure the velocity of the fluid; wherein
the first ultrasonic transceiver and the second ultrasonic transceiver are arranged to sandwich the fluid; and
wherein the method used by the ultrasonic flowmeter includes steps to calculate components parallel to the pipe regarding the velocity of the fluid on the basis of the a propagation time difference, which is the difference in time between the time that ultrasonic waves transmitted from the second ultrasonic transceiver and the time that ultrasonic waves transmitted from the first ultrasonic transceiver propagate through a first fluid propagation path traversing inside the pipe in the radial direction for a 2n−1 number of times (n is a positive integer), and a second propagation time difference, which is the difference in time between the time that ultrasonic waves transmitted from the second ultrasonic transceiver and the time that ultrasonic waves transmitted from the first ultrasonic transceiver propagate through a second fluid propagation path traversing inside the pipe in the radial direction for a 2m−1 number of times (m is a positive integer other than n).

8. A flow velocity measurement program executed by an ultrasonic flowmeter, the ultrasonic flowmeter comprising:
a first ultrasonic transceiver configured to transmit and receive ultrasonic waves and is fitted to a pipe through which a fluid flows inside;
a second ultrasonic transceiver configured to transmit and receive ultrasonic waves and is fitted to the pipe downstream from the first ultrasonic transceiver;
a main unit configured measures the velocity of the fluid;
wherein the first ultrasonic transceiver and the second ultrasonic transceiver are arranged to sandwich the fluid; and wherein the program executed by the ultrasonic flowmeter includes steps to calculate components parallel to the pipe regarding the velocity of the fluid on the basis of the a propagation time difference, which is the difference in time between the time that ultrasonic waves transmitted from the second ultrasonic transceiver and the time that ultrasonic waves transmitted from the first ultrasonic transceiver propagate through a first fluid propagation path traversing inside the pipe in the radial direction for a 2n−1 number of times (n is a positive integer), and a second propagation time difference, which is the difference in time between the time that ultrasonic waves transmitted from the second ultrasonic transceiver and the time that ultrasonic waves transmitted from the first ultrasonic transceiver propagate through a second fluid propagation path traversing inside the pipe in the radial direction for a 2m−1 number of times (m is a positive integer other than n).

* * * * *